United States Patent
Carter et al.

(10) Patent No.: US 8,181,858 B2
(45) Date of Patent: *May 22, 2012

(54) INFORMATION BANKING

(75) Inventors: Samuel Jeff Carter, Charlotte, NC (US); Ray Garcia, New York, NY (US); David Joa, San Francisco, CA (US); David Joffe, Charlotte, NC (US); John Mertz, Evanston, IL (US); Zoran Obradovic, Chicago, IL (US); Hans Schumacher, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,183

(22) Filed: Aug. 26, 2011

(65) Prior Publication Data

US 2011/0313872 A1 Dec. 22, 2011

Related U.S. Application Data

(63) Continuation of application No. 12/173,720, filed on Jul. 15, 2008, now Pat. No. 8,028,896.

(60) Provisional application No. 61/013,915, filed on Dec. 14, 2007.

(51) Int. Cl.
*G06F 17/60* (2006.01)

(52) U.S. Cl. ............ 235/379; 235/380; 705/14; 705/17; 705/21; 705/67; 705/71

(58) Field of Classification Search .................. 235/379, 235/380; 705/14, 17, 21, 67, 71
See application file for complete search history.

(56) References Cited

U.S. PATENT DOCUMENTS

| | | | |
|---|---|---|---|
| 7,200,566 B1 * | 4/2007 | Moore et al. ................. | 705/26.3 |
| 7,589,628 B1 * | 9/2009 | Brady, Jr. ................. | 340/539.11 |
| 8,028,896 B2 | 10/2011 | Carter et al. | |
| 2002/0055884 A1 * | 5/2002 | Tokuma ......................... | 705/26 |
| 2003/0126094 A1 | 7/2003 | Fisher et al. | |
| 2003/0154171 A1 * | 8/2003 | Karp et al. ..................... | 705/78 |
| 2004/0111360 A1 | 6/2004 | Albanese | |
| 2005/0125343 A1 * | 6/2005 | Mendelovich .................. | 705/39 |
| 2005/0187873 A1 * | 8/2005 | Labrou et al. ................... | 705/40 |

(Continued)

FOREIGN PATENT DOCUMENTS

WO 2005119608 12/2005

OTHER PUBLICATIONS

Office Action from U.S. Appl. No. 12/173,729 mailed Apr. 13, 2011.

(Continued)

*Primary Examiner* — Allyson Trail
(74) *Attorney, Agent, or Firm* — Banner & Witcoff, Ltd.; Michael A. Springs

(57) ABSTRACT

A method for conducting a financial transaction can be used by a person using a mobile device to conduct the transaction. The mobile device receives information related to the person that can be used for authentication purposes, such as a PIN or biometric data. The mobile device then authenticates the person by verifying the information received. If the person is authenticated, the transaction is completed using the mobile device, and if the person is not authenticated, the transaction is prevented.

25 Claims, 11 Drawing Sheets

U.S. PATENT DOCUMENTS

| | | | |
|---|---|---|---|
| 2006/0000900 A1* | 1/2006 | Fernandes et al. | 235/380 |
| 2007/0291710 A1* | 12/2007 | Fadell | 370/338 |
| 2008/0046366 A1* | 2/2008 | Bemmel et al. | 705/44 |
| 2008/0121696 A1* | 5/2008 | Mock et al. | 235/380 |
| 2008/0155268 A1* | 6/2008 | Jazayeri et al. | 713/186 |
| 2008/0183588 A1* | 7/2008 | Agrawal et al. | 705/16 |
| 2008/0223918 A1* | 9/2008 | Williams et al. | 235/379 |
| 2009/0138366 A1* | 5/2009 | Bemmel et al. | 705/17 |
| 2010/0188191 A1* | 7/2010 | Martinez de Velasco Cortina et al. | 340/5.8 |

OTHER PUBLICATIONS

Office Action from U.S. Appl. No. 12/173,729 mailed Sep. 9, 2011.
Office Action from U.S. Appl. No. 12/173,738 mailed Apr. 26, 2011.
Office Action from U.S. Appl. No. 12/173,738 mailed Oct. 6, 2011.
ISR and Written Opinion from PCT Application No. PCT/US2008/086650, mailed Apr. 4, 2009.
IPRP from PCT Application No. PCT/US2008/086650, mailed Jun. 24, 2010.
ISR and Written Opinion from PCT Application No. PCT/US2008/086666, mailed Apr. 7, 2009.
IPRP from PCT Application No. PCT/US2008/086666, mailed Jun. 24, 2010.
ISR and Written Opinion from PCT Application No. PCT/US2008/086671, mailed Mar. 5, 2009.
IPRP from Pot Application No. PCT/US2008/086671, mailed Jun. 24, 2010.

* cited by examiner

INFORMATION BANKING

CROSS-REFERENCE TO RELATED APPLICATION

This application is a continuation of copending U.S. patent application Ser. No. 12/173,720, filed on Jul. 15, 2008, which is a non-provisional of U.S. Provisional Application No. 61/013,915, filed Dec. 14, 2007, and claims priority to and the benefit of the filing dates of both such applications, and both of which applications are incorporated by reference herein in their entireties and made parts hereof.

TECHNICAL FIELD

The invention relates to a system and method for authentication of a person for use in conducting financial transactions, managing and controlling finances, and managing, controlling, and monetizing personal information.

BACKGROUND

Various information management systems and methods exist presently, and such systems use a variety of different techniques and configurations to manage such information and benefit from the dissemination of such information. However, existing information management systems suffer from certain drawbacks and disadvantages, which can be magnified when used on a large scale. One disadvantage, from the point of view of the general public, is the lack of control over such information, both in the context of privacy concerns and also the lack of the ability to selectively benefit from the dissemination of such information. Additionally, present information management systems are often unsuitable for use in conducting widespread electronic financial transactions, because the difficulty in reliably authenticating transactors electronically creates the danger of fraud. Still other drawbacks and disadvantages exist with present systems and methods.

BRIEF SUMMARY

The present system and method are provided to solve the problems discussed above and other problems, and to provide advantages and aspects not provided by prior systems and methods of this type.

Aspects of the invention relate to a method involving a financial transaction involving a person using a mobile device. The mobile device receives information related to the person that can be used for authentication purposes, such as a PIN or biometric data. The mobile device then authenticates the person by verifying the information received. If the person is authenticated, the transaction is completed using the mobile device, and if the person is not authenticated, the transaction is prevented. Reliably authenticated transactions using the mobile device are thus enabled. Additional aspects of the invention relate to a mobile device configured for use in performing this method. Further, such a mobile device can include a biometric sensor for gathering biometric information. Still further, the mobile device can be configured for automatically periodically re-authenticating the person. The device can periodically gather information related to a person and then automatically periodically re-authenticate the person by verification of the information.

According to one aspect, the device can determine, based on a characteristic of the transaction, which of several methods for authentication are necessary for authenticating the transaction. For example, transactions of a certain type or above a certain threshold value can require higher levels or multiple types of authentication. The determination can be performed by using a hierarchy of authentication levels, where each authentication level requires a different authentication method. A necessary authentication level for the transaction can be designated from among the hierarchy, and each level of the hierarchy may require the cumulative authentication methods of one or more of the lower levels in the hierarchy.

Examples of transaction characteristics that can be used in determining the selected authentication method include the monetary value of the transaction, and the type of the transaction. Examples of various authentication methods include fingerprint validation, voice validation, facial recognition validation, iris scan validation, PIN validation, and GPS location validation.

Further aspects of the invention relate to a mobile device configured for use in conducting a plurality of financial transactions related to the person using the mobile device, wherein, in performing each transaction, the processor is configured to cause the mobile device to execute one or more of the above-described methods or related methods. As described above, the mobile device may contain a biometric sensor to read biometric information, and may be configured to perform some or all of the required actions anywhere, including at a point-of-sale. The mobile device may also include a recognition element configured to recognize a payment card, such that the mobile device is configured to be used in connection with the payment card to complete the financial transaction, where the recognition element recognizes the payment card. The payment card may contain one or more different elements recognizable by the mobile device, including physical orientation elements, optical storage, smart card elements, contacted communication elements, machine decodable images, barcodes, and/or magstripes. Further, the payment card and the device may be configured so that the card cannot be used to complete a financial transaction without verification and recognition of the payment card by the mobile device.

Still further aspects of the invention relate to a computer-readable medium containing computer-executable instructions configured to cause a device to execute one or more of the above-described methods or related methods.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, nano-storage devices, and/or any combination thereof. In addition, various signals representing data or events as described herein may be transferred between a source and a destination in the form of electromagnetic waves traveling through signal-conducting media such as metal wires, optical fibers, wireless transmission media (e.g., air and/or space), and/or biomatter.

Figure 1:
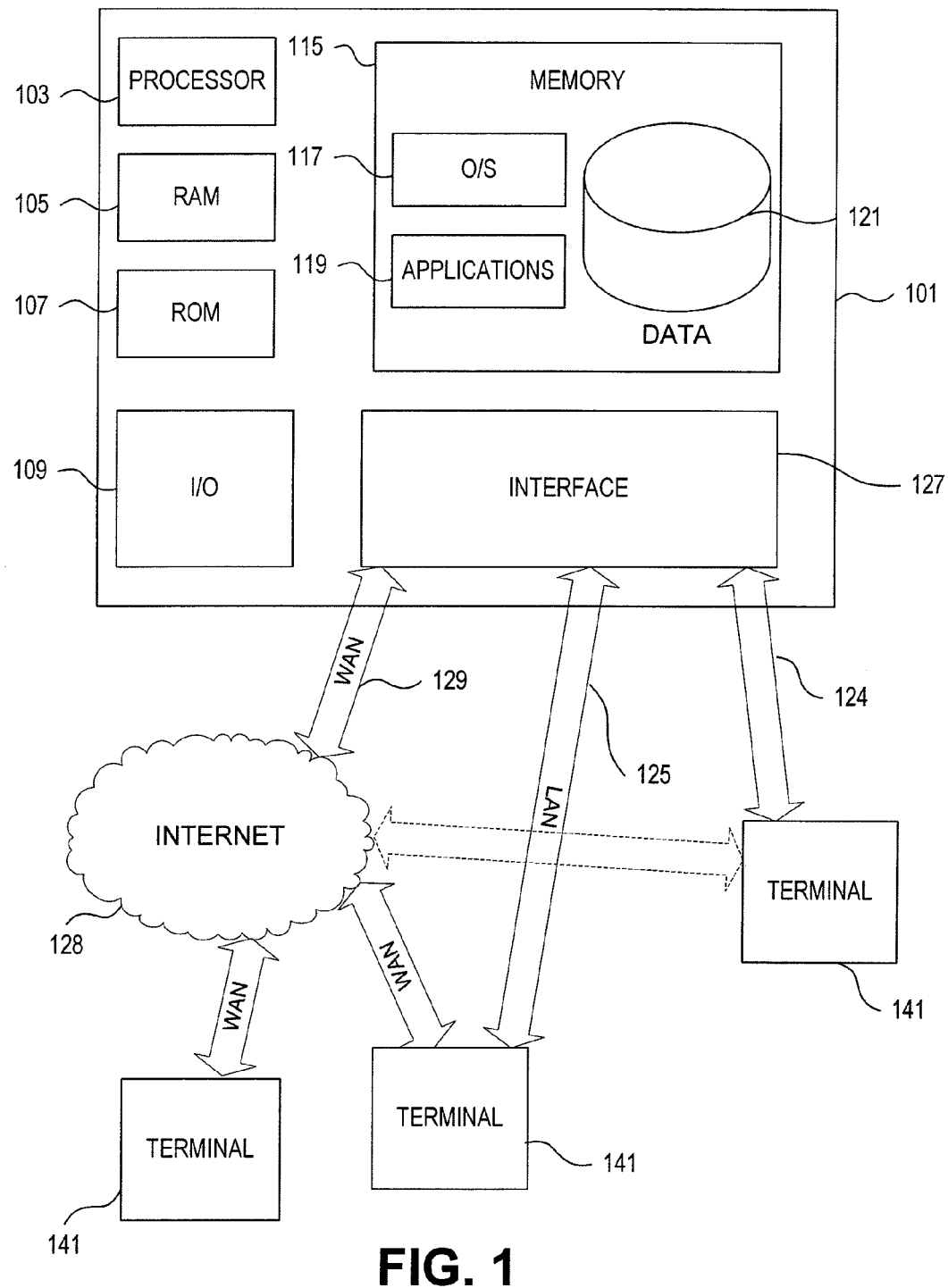
FIG. 1 is a schematic diagram of one embodiment of a mobile device.

FIG. 1 illustrates a block diagram of a mobile device 101, such as a mobile phone, PDA, smart phone, laptop computer, etc., that may be used according to an illustrative embodiment of the invention. The device 101 may have a processor 103 integral to the operation of the device 101 and its associated components, including RAM 105, ROM 107, input/output module 109, and memory 115. I/O 109 may include a user input device through which a user of device 101 may provide input, such as a microphone, keypad, touch screen, mouse, and/or stylus, and may also include one or more of a speaker for providing audio output and a video display device for providing textual, audiovisual and/or graphical output. In one embodiment, I/O 109 includes at least audio/video output, a keypad and/or touch screen, a microphone, a camera, a GPS transceiver, and a fingerprint reader (which may be included in a touch screen). The I/O 109 may also include sensors for monitoring additional characteristics of the environment, for example, a thermometer or other temperature detection means.

Software may be stored within memory 115 and/or storage to provide instructions to processor 103 for enabling the device 101 to perform various functions, including functions relating to the methods described herein. For example, memory 115 may store software used by the device 101, such as an operating system 117, application programs 119, and an associated database 121. Alternatively, some or all of device 101 computer executable instructions may be embodied in hardware or firmware (not shown). As described in detail below, the database 121 may provide centralized storage of information for the device 101. It is understood that a single processor 103 and single memory 115 are shown and described for sake of simplicity, and that the processor 103, memory 115, and database 121 may include a plurality of processors, memories, and databases respectively.

The device 101 may be configured to operate in a networked environment supporting connections to one or more other computers, such as terminals 141. The terminals 141 may be personal computers, servers, or devices that include many or all of the elements described above relative to the device 101. The network connections depicted in FIG. 1 include a wide area network (WAN) 129, and may also include other networks, such as a local area network (LAN) 125, a cellular/mobile network 124, and other communication paths, all of which provide connections to terminals 141. The terminals 141 connected to the device 101 can be any type of computer device or component, from other devices 101 to servers, personal computers, other different mobile devices, automobile computers, and any other conceivable type of computer component or device. One or more communications interfaces 127 generally provide connections to these various networks 124, 125, 129. When used in a LAN networking environment, the device 101 is connected to the LAN through a network interface or adapter. When used in a WAN networking environment, the computer 101 may include a modem for establishing communications over the WAN, and may also include transceivers for Wi-Fi, Bluetooth, infrared or other optical communication, near field communication (NFC), among other means. Connection to the cellular/mobile network 124 may be provided, for example, by a GSM/TDMA service provider. The other communication paths mentioned can include direct communication, such as by Bluetooth or Wi-Fi. In one embodiment, the device 101 may be used for voice connectivity through Wi-Fi, rather than cellular or land phone lines. The WAN 129 can provide connection to the Internet 128, and it is understood that other communication paths, such as cellular/mobile network 124 can also provide Internet connectivity. It is understood that the device 101 can connect to each one of the other terminals 141 through more than one of the networks 124, 125, 129. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the device 101 according to an illustrative embodiment of the invention may include computer executable instructions for invoking user functionality related to communication, such as email, short message service (SMS), peer-to-peer exchanges, and voice input and speech recognition applications, as well as any other applicable techniques.

In one embodiment, the device 101 is a mobile phone, and includes at least a microphone and audio output for phone communication, in addition to other I/O 109 hardware described above. As with many modern mobile phones, the device 101 may store and use various media, such as music, pictures, video, etc.

Figure 2:
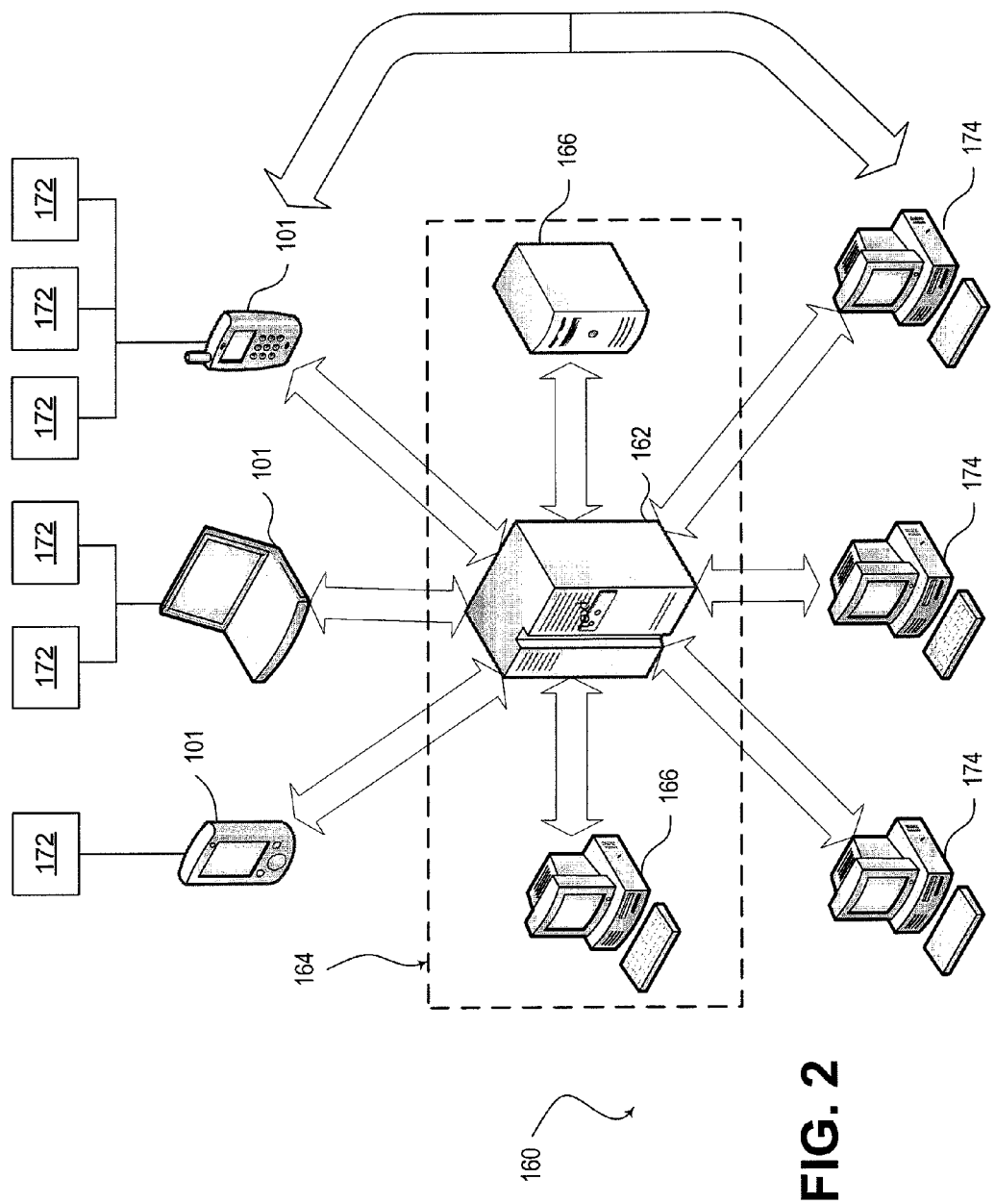
FIG. 2 is a schematic diagram of one embodiment of a system suitable for use in conducting financial transactions and processing information.

In one embodiment, the device 101 is usable in conjunction with other devices over a network, through a centralized data control module, such as a server, which controls transactions and communications between devices 101 and with other computer components. FIG. 2 illustrates one example of a networked system 160 in which the device 101 can operate and perform the actions and methods described herein. In the exemplary system 160, a central computer 162 is located in, and operated by, an institution 164 (such as a financial institution), and is connected to other computers 166 within the institution 164. The central computer 162 contains at least a memory and a processor, and will generally contain many other components, including any components of the device 101 identified in FIG. 1 and described herein. The central computer 162 is connected to a plurality of devices 101, each device being associated with one or more persons 172. The devices 101 may communicate with the central computer 162 through a variety of networks and communication paths as do the terminals 141 in FIG. 1, such as through the wide area network (WAN) 129, the local area network (LAN) 125, and the cellular/mobile network 124 described above and depicted in FIG. 1. It is understood that a single central computer 174, with a single processor and single memory, are shown and described for sake of simplicity, and that the computer 174, processor, and memory, may comprise a plurality of computers, processors, and/or memories, respectively.

The central computer 162 may function as a centralized data storage and control module for access by the devices 101, and may also process information for the devices 101 and/or provide application service to the devices 101 for use in processing information. In this embodiment, the memory of the central computer 162 may contain a centralized database storing information related to the persons 172, of any of the types discussed herein. It is understood that data can be stored on the person's device 101 as well. In another embodiment, a centralized database may be replaced by distributed data storage, such as by dividing each person's data into distinct, encrypted pieces that are transmitted through the control network and stored in other devices. In this configuration, the devices themselves do not know to whom the information stored therein belongs or relates. The data stored in this manner may include preference, history, and authentication data, and any other information discussed herein. Additionally, the central computer 162 can be configured for communication with other electronic devices 174. Some of the other electronic devices 174 may be configured for conducting financial transactions, and may be positioned at locations for conducting financial transactions, such as retail locations and points-of-sale at such locations. Others of the electronic devices 174 may be located or connected to other financial institutions, which may hold one or more accounts associated with a person 172. The device 101 may also communicate with the other electronic devices 174, either through the central computer 162 or directly, as indicated in FIG. 2.

The device 101 and the other components of the system 160 can be used in connection with processing financial transactions and processing information, as described herein, along with many other functions as desired. As used herein, financial transactions include not only traditional sales, but any economic exchange, including promissory exchanges, bartering, and all types of sales, including sale of data or other information and sale of real property or other legal rights. Such transactions may incorporate monetary currency or any other type of quantifiable currency, such as a person's time, a tax benefit, or an agreement to purchase or provide a meal, a gift, or other future benefit, to list a few examples.

In general, the device 101 is authenticated to, and connected with, a person or persons 172, as illustrated in FIG. 2. The device 101 contains or otherwise has secure access to a great deal of important information regarding the person 172. Such information may be stored in memory 115 or securely accessible by the device 101 from another source, such as the centralized database and other means described above. Nearly any type of information may be contained in or accessed by the device 101, and in one embodiment, the device 101 contains or accesses certain information that may be completely controllable by the person 172 and other validated information that may be influenced by the person 172, but not directly controllable thereby. Such validated information may include identity information, background information, credentials, information on credit and debit facilities, credit profile, portfolio information and concierge information. Such personally controlled information may include transaction controls, privacy preferences, loyalty/affinity information, medical records, monetization information, and social network information.

Identity and background information may include information such as name, address, age, social security number, personal history, and authentication information. Credentials may include degrees, licenses, and other such information. Credit and debit information may include any monetary accounts owned and/or managed by the person. Portfolio information may include information on assets and liabilities of the person. Concierge information, transaction controls, privacy preferences, loyalty/affinity information, monetization information, and social network information are described in greater detail below.

In another embodiment, the device 101 may have access to personal information regarding one or more other people having relationships with the authenticated person. The information regarding other people may be of any type identified herein. For example, a parent may be authenticated to a device 101 that contains or accesses personal information for all of his or her children, or other family members, such as identity and background information and credit and debit information for each family member. In another example, an employee of a company may be authenticated to a device 101 that contains or accesses personal information for other employees. As a further example, persons in a social network may have access to certain personal information of other friends or networked contacts, which may include information on the contact's reputation, credentials, etc. In a further embodiment, the device 101 may be authenticated to more than one person, and may contain or access information regarding each person and/or others having relationships to each authenticated person. Access to other persons' information may be controlled by privacy preferences of the authenticated person and/or privacy preferences of the other person(s).

In one embodiment, the device 101 is configured for multi-factor authentication of transactions. As stated above, in one embodiment, I/O 109 includes at least audio/video output, a keypad and/or touch screen, a microphone, a camera, a GPS transceiver, and a fingerprint reader (which may be included in a touch screen) to enable this authentication. For authentication purposes, the I/O 109 of the device may include a biometric sensor, which can collect one or more types of biometric data. As described above, a camera, a touch screen, a microphone, etc., can be configured to function as biometric sensors, for collecting data such as facial recognition data, fingerprint data, and voice recognition data, respectively. A hierarchy of authentication levels and/or authentication methods may be utilized, where a necessary authentication level and/or method is determined by characteristics or context of the transaction. Such characteristics can include the value of the transaction, the location of the transaction, safety and health concerns, or various other characteristics that may affect the desired or appropriate level of security. Characteristics of the transaction necessitating different authentication levels may also be dynamic in nature. For example, if the overall characteristics of the transaction, such as detected behavioral information, indicate potential fraud, the necessary authentication level may change.

In one embodiment, the device 101 is configured for five levels of authentication. The multi-factor authentication allows for increased authentication requirements as the value of the transaction increases, in one embodiment. Additionally, as authentication may be required for all purchases, and greater authentication can be required for higher value (and higher risk) purchases, the risk of fraud is greatly decreased. The higher authentication levels may require different types of authentication. Additionally, each increasing level of authentication may cumulatively require authentication by all of the methods of each lower level in the hierarchy. In other embodiments, the number, type, and gradation (if any) of authentication can be varied as desired, based on the context of the transaction. For example, in one embodiment, the necessary level and type of authentication for various transactions may be controlled, at least in part, by the person's preferences. It is understood that other entities, such as an institution associated with the phone, may have some control over these aspects as well. In addition, if the authentication requirements change depending on the value of the transaction, the person may have at least some control over the specific values where the authentication level changes. Further, various levels of authentication may be required for other actions besides purchases, for example, when accessing account data or adjusting transaction controls or privacy settings.

The biometric data for several of the authentication features may be continuously updated. In one embodiment, each biometric validation (such as fingerprint, voice, facial/iris, etc.) can add to or be used to modify already-stored biometric data, which can increase the reliability of future authentication. Additionally, biometric data can be passively updated or augmented. For example, voice recognition data can be updated during phone conversations without notifying the person speaking.

A first level of authentication is a fingerprint identification, which can be quickly and easily accomplished by the fingerprint reader of the I/O 109. In one embodiment using value-based authentication, fingerprint authentication can be required for all transactions, due to its ease and simplicity. As stated above, a different first authentication level may be used for some or all transactions in other embodiments.

A second level of authentication is a personal identification number (PIN) that is memorized by the person and entered, such as via a keypad, touch screen, or voice recognition. In one embodiment using value-based authentication, transactions of higher value may require PIN authentication, as well as fingerprint.

A third level of authentication is a voice biometric identification, which can be performed locally or by transmission of voice data to a remote source. In one embodiment using value-based authentication, transactions of still higher value may require PIN, fingerprint, and voice biometric authentication. In some embodiments, voice authentication may be the first level of authentication, and in one embodiment, the device 101 may incorporate continuous voice authentication. For example, the device 101 may be prevented from making any transactions unless voice identification has been made within a certain time period (e.g., within the last hour).

Additionally, in one embodiment, as stated above, the device 101 can continuously update the stored voiceprint used for voice identification, resulting in more accurate voice identification. Voiceprints may be stored on the device 101 and/or in a remote location, such as a centralized database or other means described above. Each recorded voiceprint includes some degree of error, depending on various considerations such as the type of device, the location of the device, environmental conditions, etc. By recording and continuously updating voiceprint records, the error in the voiceprint can be accounted for, thus ensuring more accurate voiceprints. In another embodiment, voiceprint updating can be performed in conjunction with GPS features, and the location where each voiceprint was made can be recorded and correlated with a measured degree of error for the respective voiceprint. Different voiceprint standards can be used for different GPS locations, as certain events (noise, reception, etc.) in different locations can affect voice quality. Further, this data can be used to predict locations where a user can get high-quality voiceprints using the device. Currently existing software is capable of analyzing a voiceprint to determine a quantitative level of error in the voiceprint, based on the frequency response in the signal. One or more thresholds can be designated to determine different qualities of voiceprints. In a further embodiment, the person's voiceprint can also be continuously updated based on voice reception on another device, such as when the device 101 is used as a phone to call another person's phone.

A fourth level of identification is facial recognition, which can also be performed locally or by transmission of facial data to a remote source. In one embodiment using value-based authentication, transactions of very high value may require PIN, fingerprint, voice biometric, and facial recognition authentication. Iris scanning, such as by using the device's camera, may be used as part of, or instead of, facial recognition. The iris scanning may be a passive part of the facial scan, in one embodiment.

A fifth level of authentication is GPS location authentication. In some embodiment, such authentication can be reserved for significant transactions having high value, such as mortgages. In such an embodiment, even after the first four levels of authentication are met, the transaction will be prevented unless the person is identified to be in a specified location. For example, a mortgage may be prevented from closing if the person is not in a bank. In another embodiment, authentication may include checking the GPS location for accuracy. For example, authentication may fail if the transaction is taking place at a retail store but the GPS indicates rapid movement, or if a detected temperature at the transaction location is sufficiently different from an expected transaction at the particular GPS location. In a further embodiment, GPS authentication can be incorporated into transaction controls, as described below.

In one embodiment, the levels of authentication described above, and the order of application of such levels, may be variable and context-specific. Further, the necessary levels of authentication may, in some cases or in all cases, not be dependent on the value of the transaction. In one embodiment, the level of authentication may depend on the type and/or the location of the transaction, which may be at least partially controlled by personal preferences. For example, when making bill payment transactions, it could be required that the device is connected to a home computer (such as by wired, wireless, Bluetooth, etc.) before the transaction can be processed. The location of the device could be verified by GPS. In some cases, such as the case above, GPS may be the primary authentication, or the only necessary authentication.

As described above, the device 101 is configured for GPS location. In one embodiment, the GPS location feature is always turned on, but the GPS location is not always published, depending on privacy preferences, as described below. The continuous GPS location allows for location-based features to be utilized in connection with the device 101, as described in greater detail below.

The device 101 can be configured for continuous authentication. Generally, continuous authentication can be performed by periodically gathering information related to the user of the device and periodically authenticating the user by verification of the information periodically gathered. The information gathering can be done automatically, such as by periodically prompting the user for authentication and/or passively gathering information. Many types of continuous authentication can be used, such as the continuous voice authentication described herein. If periodic authentication fails, some features of the device may be disabled. For example, the ability to conduct financial transactions or make telephone calls may be disabled until the user is re-authenticated. Additionally, as described herein, notifications can be generated based on failed authentication, such as emails to the owner of the device 101 or communications to authorities or other third parties.

Another feature of the device 101 is a concierge service. The device 101 can connect through networks to provide services and information on demand, at any time. In one example, the concierge service can search to find businesses, and to determine whether those businesses offer certain services or products. In one embodiment, the concierge service can access SKU data for a business and determine relevant information, such as whether a particular product is in stock and what the current price is, along with any sales or special offers associated therewith. In another example, the concierge service can provide information to assist with monetization of personal information, as described in greater detail below. In a further example, the concierge service may include a map service, or may provide a link to a map service. Many other types of information can also be provided by the concierge service. In one embodiment, the concierge service can be provided by or through the central computer 162 and the financial institution 164, as shown in FIG. 2, in combination with the device 101. However in another embodiment, the concierge service may be provided by another entity or entities. Such entities may include additional servers or other network entities, the device 101, and other devices connected in some way, such as by a network or in a common location. The provider of the concierge service may also change based on present context or circumstances. For example, the device 101 may provide the service alone if the device 101 contains sufficient information to do so, but may consult another entity or entities if needed. Additionally, the device 101 may combine with other entities to provide the service. For example, the device 101 may collect information from a plurality of different sources and may combine or configure this information into a useful format.

The concierge service may be provided as a continuously-operating service, or may operate only when specially accessed. Additionally, the concierge service may be configured for incremental purchase. For example, a person may be able to purchase access to the service on an hourly, daily, weekly, monthly, or yearly basis. The device 101 may notify the person when the purchased subscription is close to expiring, particularly when purchased on a short term basis, such as a quarter-hourly, half-hourly, or hourly basis.

The device 101 can be configured to generate reminders and notifications for various activities in connection with the concierge service. Such reminders and notifications can be stored manually, or may be stored automatically based on other actions. For example, the concierge service may automatically store a reminder to buy a product that was previously searched for, or a reminder may be stored when a bank account reaches a certain balance. Other examples of automatic reminders are described herein below. Additionally, the reminders can be activated in various ways, such as at a set time or by GPS location. For example, if the GPS indicates that a person is in a particular location, a previously stored reminder associated with that location may be activated. Such a reminder may remind the person to visit a bank or ATM when one is near, or to buy a particular product when near a store carrying the product, or to notify the person of certain loyalty or affinity offers. The device 101 may be used to generate warning reminders to the person as well. In one example, the GPS could detect that a person is in a no-parking zone and the device 101 may prompt the person with a warning reminder. These reminders could be incorporated as part of the concierge service. In a further example, the device 101 may be tied to an online auction site, and may generate a notification if a person has been outbid or if an auction of interest is close to ending. The automatic storing and activation of reminders can further be subject to the user's privacy settings.

In one example, the device has a GPS or other positional sensor and is configured for collecting positional information and generating notifications or reminders based on positional information. The device 101 detects the current position of the device and receives information about one or more locations proximate to the current position, along with details about each location. The information may be received based on requests from the device 101 and by connection or correlation with other pre-existing information stored on, or otherwise accessible to, the device 101, including non-positional information. For example, as described in the method 300 below, when the person has used the device 101 in connection with purchasing a bottle of wine, the device 101 can detect when the person is proximate a store selling the wine, or when the person is proximate the appropriate department within the store. When relevant location information is detected by the device, a notice is automatically created based on the current position and the relevant proximate location. Such a notice may typically include at least some details regarding the relevance of the location.

The device 101 can be configured for access to credit and debit facilities, as well as other accounts, including stored value accounts such as gift cards, home equity accounts, trading accounts, 401(k) accounts, savings or money market accounts, or any other type of account. As described below, the device 101 can enable the person to select which of many accounts a particular transaction will be applied to, including investment accounts, money market accounts, and other such accounts not commonly used for payment at present. Online banking features, such as checking and transferring balances may be performed. Additionally, the device 101 can arrange for payment at the point of sale from one of many different accounts linked to the device 101. Further, account management features may be included, which can notify of potential withdrawals exceeding an account limit and/or actively prevent accounts from a withdrawal exceeding an account limit. Assets can be shifted from one account to another in real-time to assist in prevention of withdrawals exceeding an account limit. In another embodiment, the device 101 may have value stored thereon that can be applied to transactions, which allows transactions without involving an external account. In a further embodiment, the device 101 could be used to request a monetary transfer from another account and/or device. For example, a child may use the device 101 to request money from his/her parents, such as through the parents' similar devices. Likewise, the device 101, when used as a phone, may be used to transfer calling minutes to and from another device, and in some instances, calling minutes may be usable as currency. It is understood that various levels of authentication, as described above, may be required for access to account facilities.

The distribution of the information contained in, and accessible to, the device 101 can be controlled or managed by the person, and privacy preferences can be set to govern such control and management. In one embodiment, the device 101 is initially provided with highest-level privacy controls, so that other computers cannot draw information from the device 101. The person can then incrementally release privacy controls as desired, to allow certain types of information to be shared with others, and also to allow others to transmit prompts to the person. Such prompts may include reminders and notifications of various events, including sales or other offers. Offers for monetization of information may also be generated, as described below.

The device 101 can be configured for enhanced social networking features. Depending on a person's privacy settings, a large variety of information about the person may be shared with other people in the person's social network. This shared information may include information actively generated by the person, such as experiences and recommendations, as well as information passively generated, such as information automatically collected by the device 101 or other computers. Additionally, some such information may be shared instantly and automatically when it is generated, rather than at a later time. This instant sharing of information can create much more efficient measurement of customer service and satisfaction, as well as distribution of such information. It is understood that the person's experience and recommendation information may also be monetizable. The social networking features can be expanded to include indirect contacts, such as friends-of-friends.

The social networking features of the device can also be used in conjunction with the GPS features. For example, the device 101 can locate other people in the person's social network that have similar devices 101 who are in close proximity, through their GPS features (subject to each person's privacy preferences), such as when the person is at an event with others in the person's network. In another example, the device 101 may detect persons with similar profiles or preferences, either in the same location or anywhere throughout the network, and may suggest contacting these other persons 101 for social networking.

The social networking features may further include group decision making features. For example, if the person is a member of a group with a specific interest, the device 101 may receive recommendations from the group on an ongoing basis. These recommendations can be presented to the person in different ways. In one embodiment, the recommendations can be stored on the device passively until the person is in a relevant GPS location, such as a store that carries a particular product of interest to the group, at which point the recommendations will be presented to the person. The device 101 may also permit the person to get recommendations from other people, for example, from information stored in a database/server, or by actively requesting recommendations in real time, from group members who are currently online. In another embodiment, a store or other business may have a promotion associated with the group, similar to the individual loyalty/affinity features discussed herein.

The device 101 can be configured to afford the person varying levels of control over information and processes related to the device 101, as described above. One type of information controlled by the person through the device 101 is transaction control information, which can be set to control any aspects of transactions through the device 101 as a preference. Such controllable aspects include the time and place of the transaction, the identity of the transactor, and the identity, nature, and/or amount of the transaction. In one example, the person's device 101 may be configured to prevent purchase of alcohol after a certain time of night. In another example, the person's device 101 may be configured to prevent purchasing a product that would violate a purchase-based monetization agreement. In further example, the device 101 may be configured to prevent certain types of financial transactions unless the device is located within a bank or the person's residence, based on GPS location.

The device 101 may be also configured for automatic transaction governance, which may or may not be controllable by the person. For example, the device 101 may be prevented from making transactions that would violate laws, such as purchasing alcohol by an underage person, after legal purchasing hours, or by a person who may have relevant probation obligations. Similarly, the device 101 may be configured for automatic checking and verification of the factors controlling this transaction governance. For example, the device 101 may be configured to accomplish automatic verification of age, driver's license validity, legal history, or probation restrictions. Partnering with official agencies, such as a state department of motor vehicles, may assist in accomplishing this function.

The device 101 can be used in conjunction with government agencies and departments other ways as well. For example, a city may implement a city-wide WAN, which can be used by civil service departments to instantly contact masses of people using devices 101, to give important information (e.g., weather, dangerous conditions, etc.). The device 101 may also have emergency features, such as for quickly contacting police, fire, ambulance, etc., all of which could work in conjunction with GPS data collected by the device 101. In another embodiment, the validated identification of the device 101 may be used by law enforcement, customs, security, etc., in place of traditional identification means.

In addition to the authentication features identified above, many other features for fraud prevention and prevention of unauthorized identity use may be incorporated for use with the device 101. For example, the GPS locator can be used to detect and shut down devices that are reported as taken without authorization. Similarly, device 101 may be configured for detection and investigation of unauthorized use or fraud, such as by using the GPS locator or purchase data. The device 101 can also be used in investigation and forensics, such as by capturing fraud or fraud-like events. For example, when things happen outside of normal authentication or transaction patterns, such as if the device is used to make an unusual purchase or is detected to be in an unusual location based on a collected history for the person, a record is made documenting the details thereof. These records can be used later to build an audit or investigation trail. Additionally, when the device 101 detects fraud or fraud-like events, the device 101 may perform a quick investigation. The investigation may be accomplished, for example, by a prompt for an authentication. As described above, continuous voice authentication features may be useful in fraud prevention. For example, the device 101 may be configured so that, if it is taken without authorization, it cannot be used at all without continuous voice authentication.

The device 101 may additionally be configured for financial assistance, such as tax preparation assistance, personal budgeting, and financial planning. Tax preparation assistance can be accomplished by storing and cataloguing receipts for later use in preparing tax returns. Personal budgeting and financial planning assistance can incorporate features such as real-time account balance checking, transaction controls to limit spending, and notification of withdrawals exceeding an account limit and prevention. When the device 101 is used in connection with a financial institution, the institution could use the device to provide investment advice, budgeting advice, and other financial assistance to the person. Such advice could be passively and/or automatically provided, or may be actively sought by the person, or both.

Figure 10:
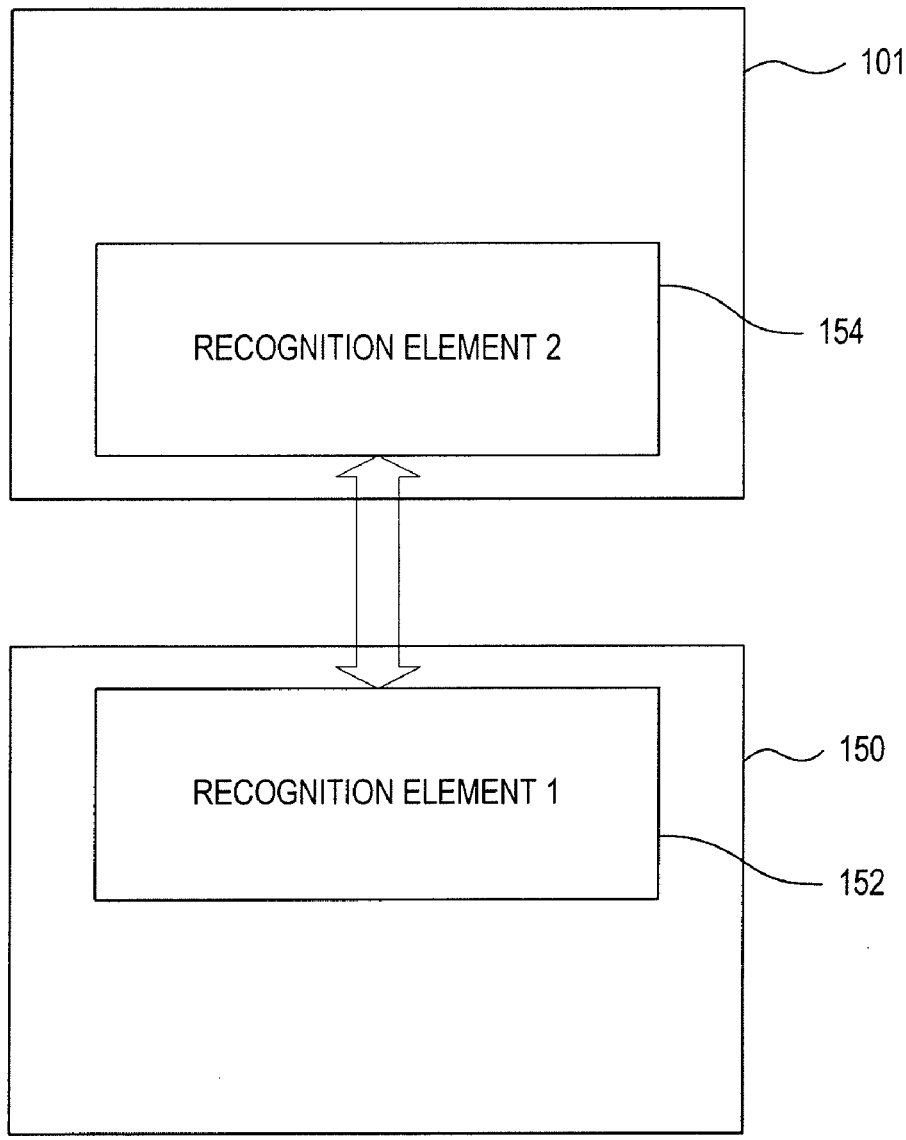
FIG. 10 is a schematic diagram of one embodiment of a combination of a mobile device and a payment card.

The use of the device 101 creates opportunities for new methods of completing purchasing transactions. One example is device-to-card association, which associates a particular device 101 with a particular payment card (such as a credit/debit card) in one or more ways. In one general embodiment, the device 101 is used in connection with a card to make a purchase, and the card cannot be charged unless the device provides authentication. This connection and authentication can be accomplished in many ways. FIG. 10 illustrates a combination of a device 101 and a payment card 150 that are configured to be used in conjunction with each other. In this embodiment, the payment card includes a first recognition element 152, examples of which are described below. Likewise, the device 101 includes a second recognition element 154 configured to complement the first recognition element 152. The payment card 150 and the device 101 are configured to be used in connection with each other to complete a financial transaction, and the first recognition element 152 and the second recognition element 154 can used in combination to authenticate the financial transaction. Various examples of the recognition elements 152, 154 and the use of the card 150 and device 101 in combination are described below.

In one embodiment, the card includes one or multiple magstripes, which could be used for different purposes. The magstripe is anonymous, but can be verified via a short message service (SMS) channel, by sending a SMS to the device 101 upon purchase, which the merchant can identify independently. A unique number associated with the SMS could replace the traditional signature required. This feature could be used for online transactions as well.

In another embodiment, the card contains an identification mark that is readable by the device and/or a barcode reader. The identification mark may contain some information that is unsecured and other information that is readable only after entry of a passcode. The device 101 may contain hardware and software for reading the barcode, including through use of a camera of the device.

In another embodiment, the card may have transparent plastic with an etched image only visible when the card is placed on the device's screen and the image on the device decrypts the transparent marker, providing visual verification of the device-to-card connection.

In another embodiment, the card may have both contacted and contactless smart card features, such as a proximity chip. The device can be provided with near field communication (NFC) capability to detect the proximity chip and provide validation. The device may also include a carry slot for the card, which may be used for contacted or contactless interaction with the card. In this manner, the card can also act as a second SIM card for the device. Additionally, when used in this manner, the card can interface with an external computer as an authentication card, or the device could connect to the external computer via Bluetooth or USB to function as an authentication device.

In another embodiment, the card may contain physical orientation features, such as an orientation hole, to provide for safe machine dispensing.

In a further embodiment, the card may be designed to contain optical information storage features. For example, the card itself may be a mini-DVD disk readable by a DVD reader, which may be read-only or rewritable, depending on the situation.

Each of the above card embodiments could be used alone, or a card could be produced using any combination of the features of such embodiments. The card can be configured so that use without the device is prevented, or may be configured to process transactions differently without the device. For example, the card-issuing company may charge a higher additional charge or interest rate when the card used without the device, or a message may be sent to the person any time the card is used without the device. Additionally, some embodiments of the card described above may permit dispensing from an instant-card vending machine.

The features of the device 101 allow new types of payment not enabled by previous systems. For example, such types of payment by use of the device 101 include near field communication, enabling contactless payments using the device, and person-to-person/mobile-to-mobile payments based on Wi-Fi, enabling completely digital, paperless transactions.

The device 101 provides many advantageous features in purchasing, some of which are described in other locations herein. As described above, a variety of payment methods can be chosen, such as from one or more of a plurality of external accounts and from stored value on the card, among other examples. The accounts used for transactions may include types of accounts that are not normally used for such transactions at the present time. Also, the device 101 may, in one embodiment, replace an entire wallet, by including access and validation to a person's credit cards, checkbook, etc., as well as identification features. Transaction payment using the device is authenticated reliably. The device 101 can also contain store-specific and device-specific discount/loyalty/affinity features to benefit the user. In one embodiment, the device 101 can provide currency translation ability for use of the device for payment in or to foreign countries. Many other such advantages are described herein.

The device 101 and associated services may be offered by or in connection with an institution, such as a financial institution, among other types, and the person may perform transactions with or through such an institution. Such an institution may offer additional benefits or transactions to the person using the device 101. For example, the institution may offer benefits simply for using the device 101, such as a financial institution giving rebates or rewards on purchases made using the device 101 as an incentive based on the increased security of purchases using the device 101. In another example, the institution and the person could cooperate to monetize the information. One example of this cooperation is by the person paying a subscription charge for the institution to collect monetizable data, which can then be sold by the person. Another example of this cooperation is by the institution buying the data directly from the person. A bidding system for the monetizable data could also be instituted, based on an assessed value of the data.

Figure 3:
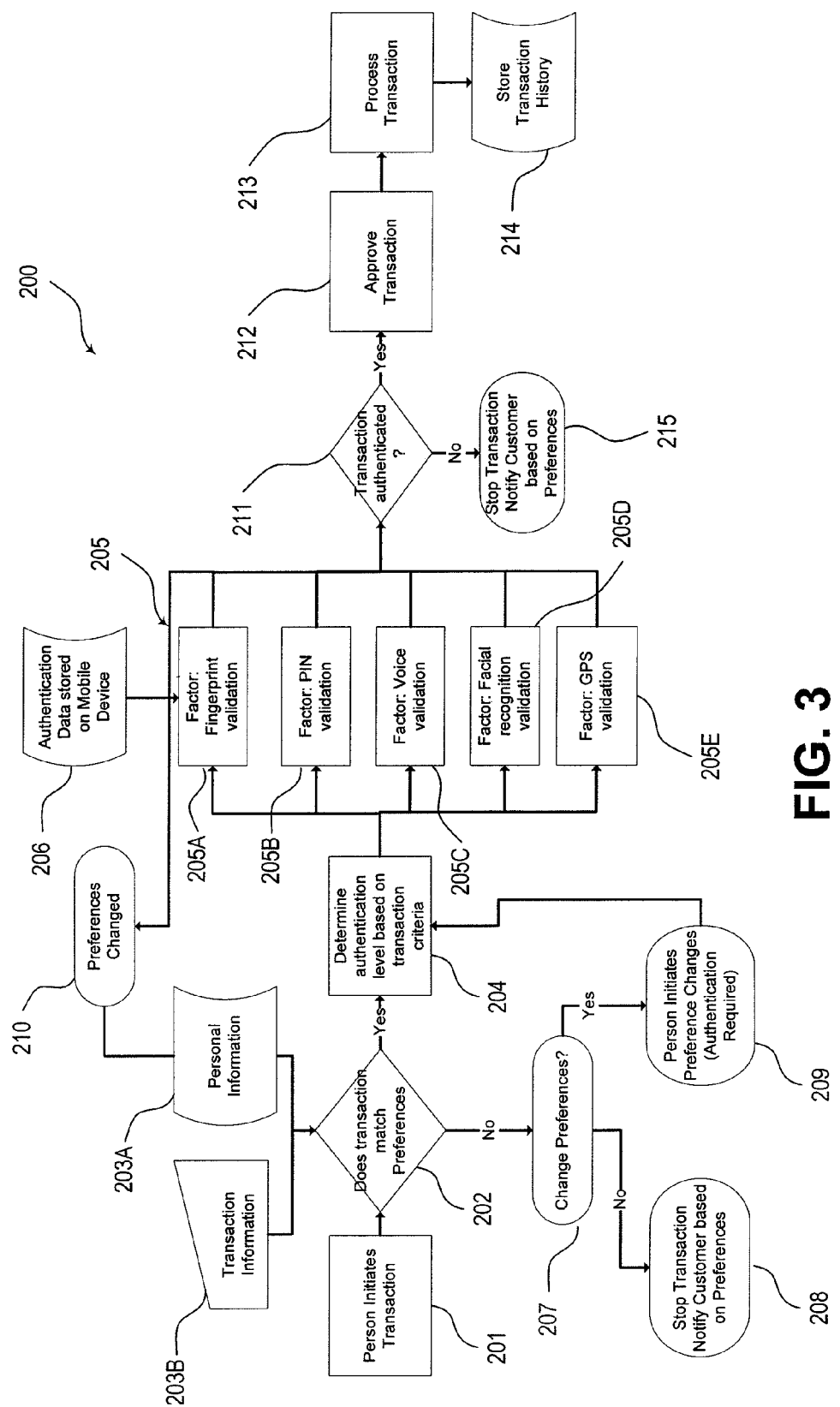
FIG. 3 is a flow diagram illustrating one embodiment of a method of completing a transaction.
Figure 4:
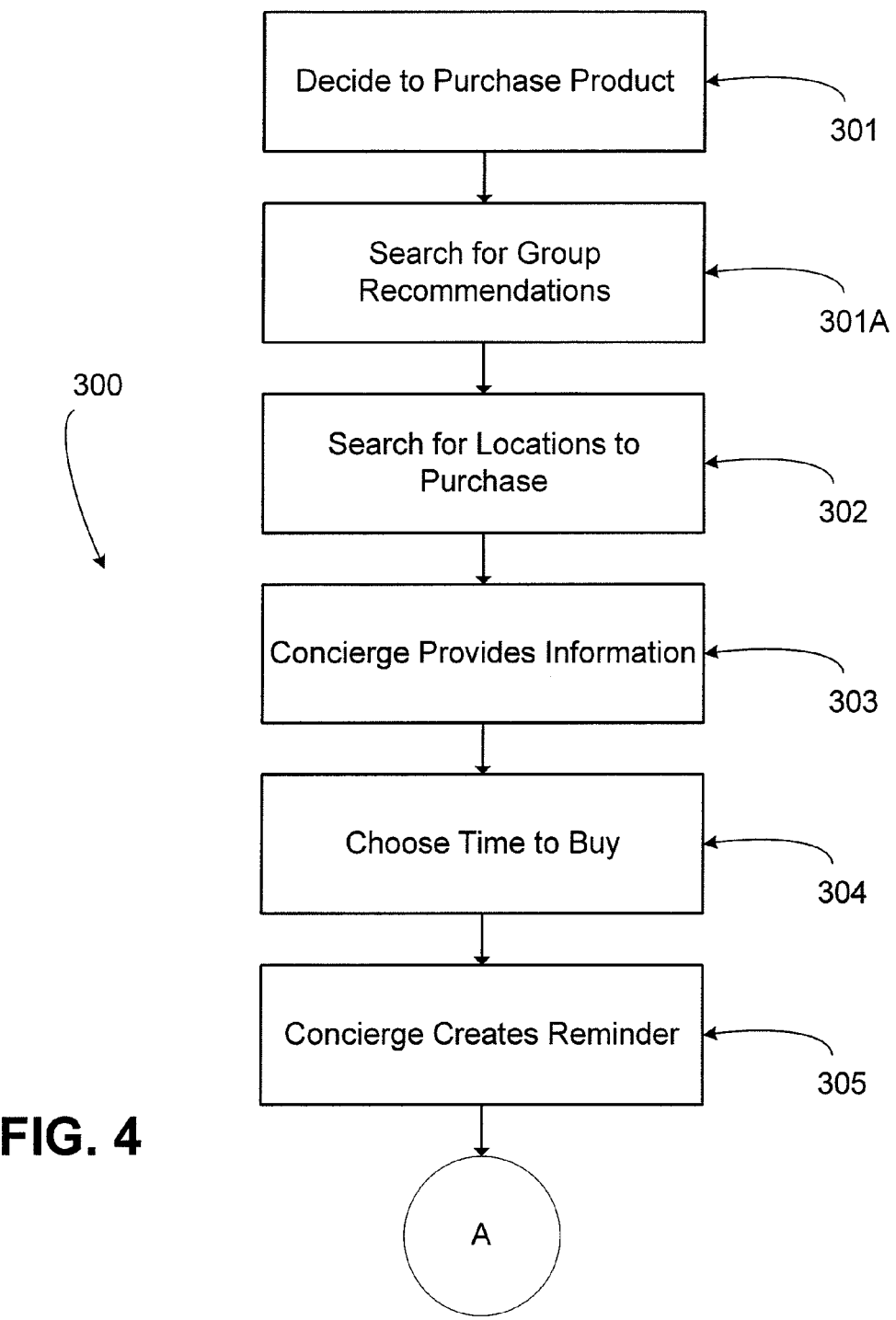
FIGS. 4-9 are a flow diagram illustrating one embodiment of a method for purchasing an item.
Figure 5:
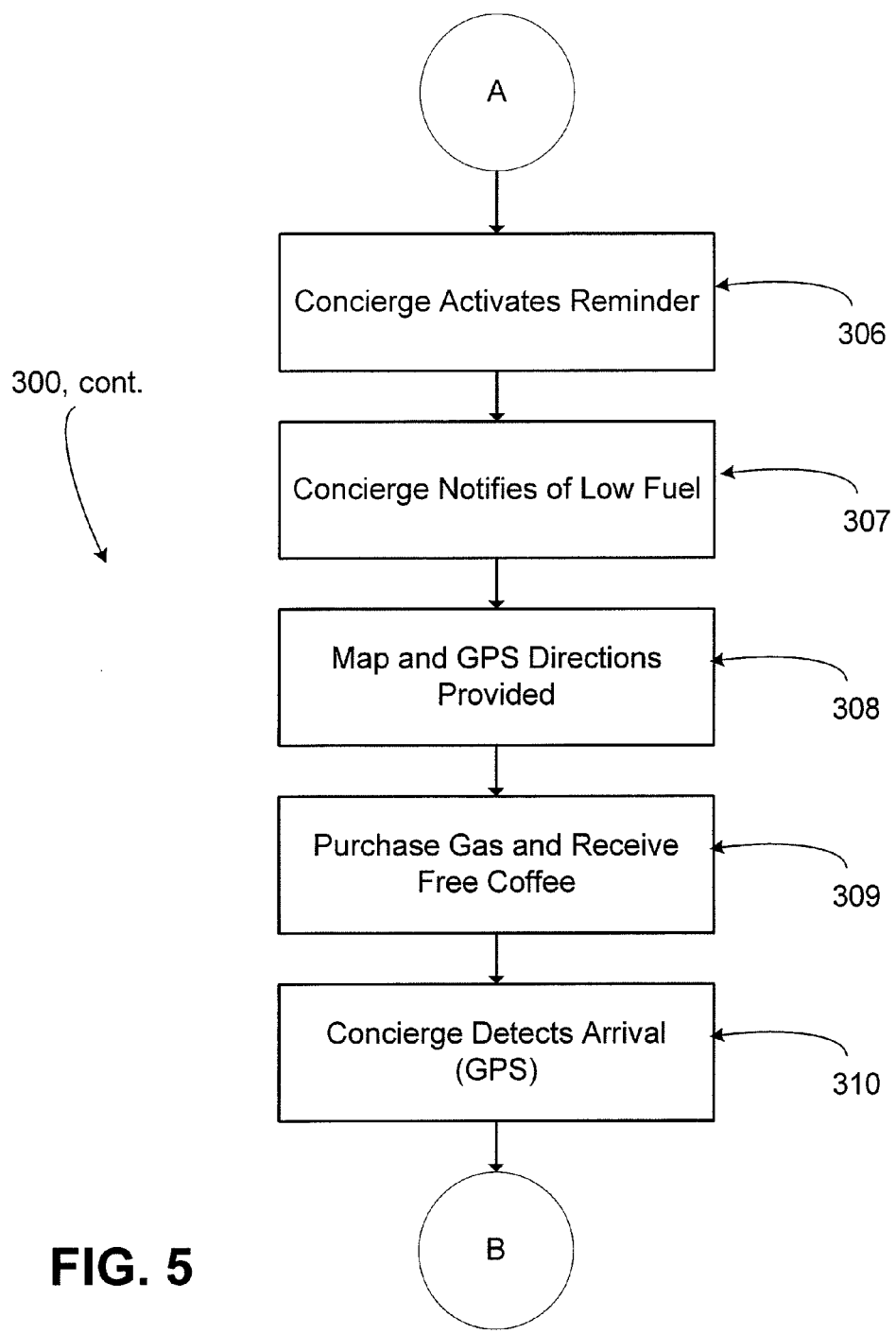
Figure 6:
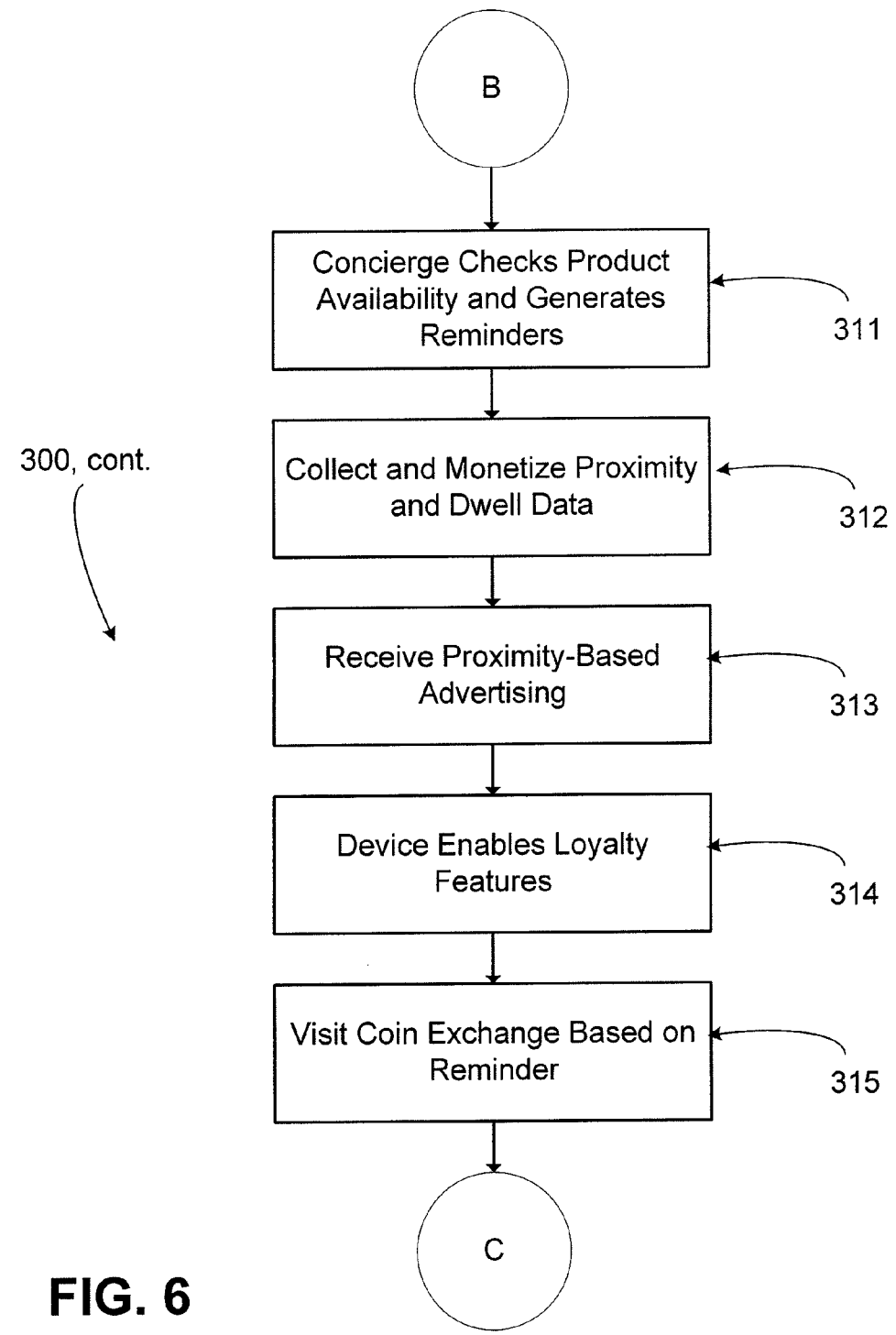
Figure 7:
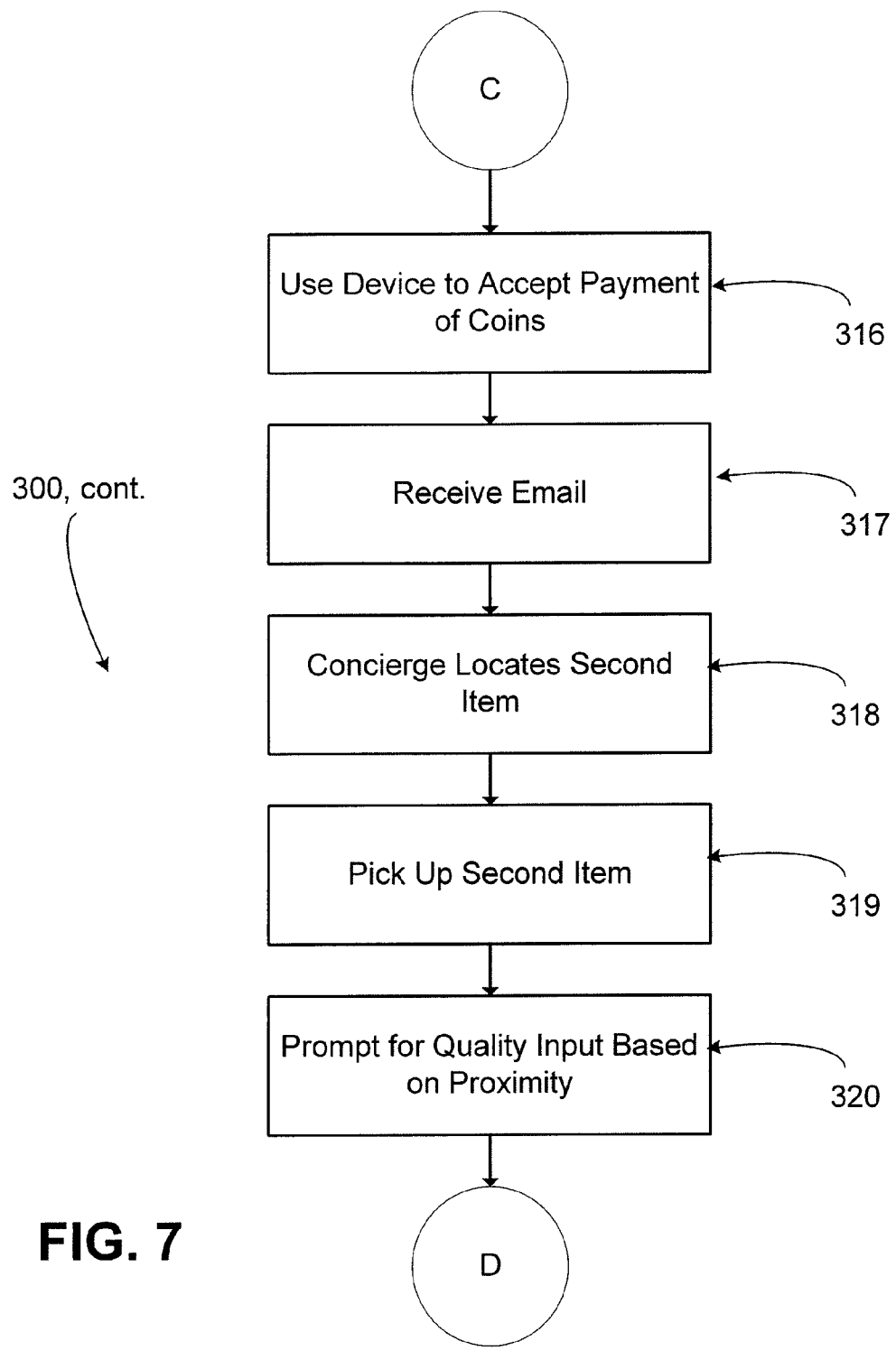
Figure 8:
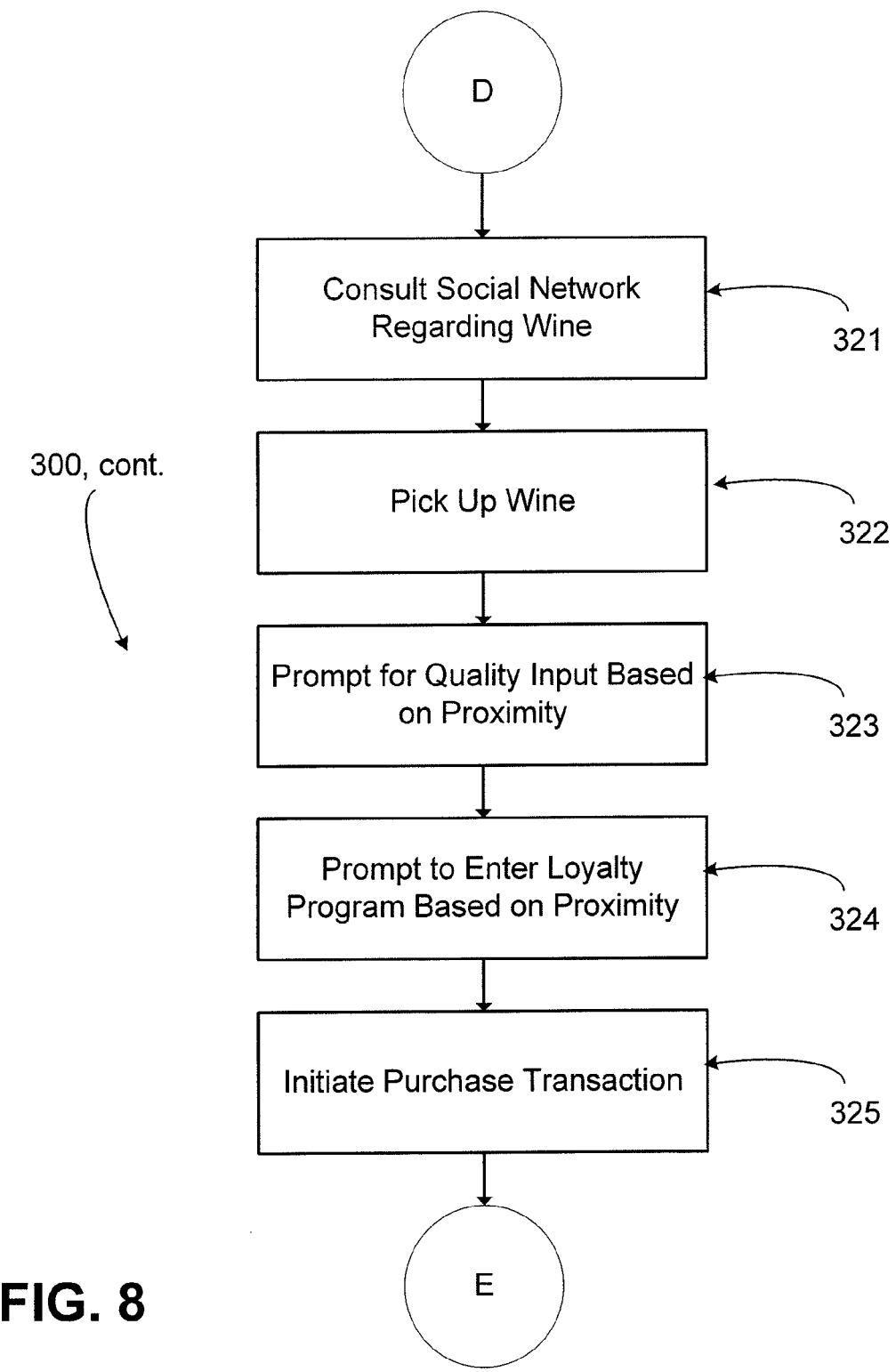
Figure 9:
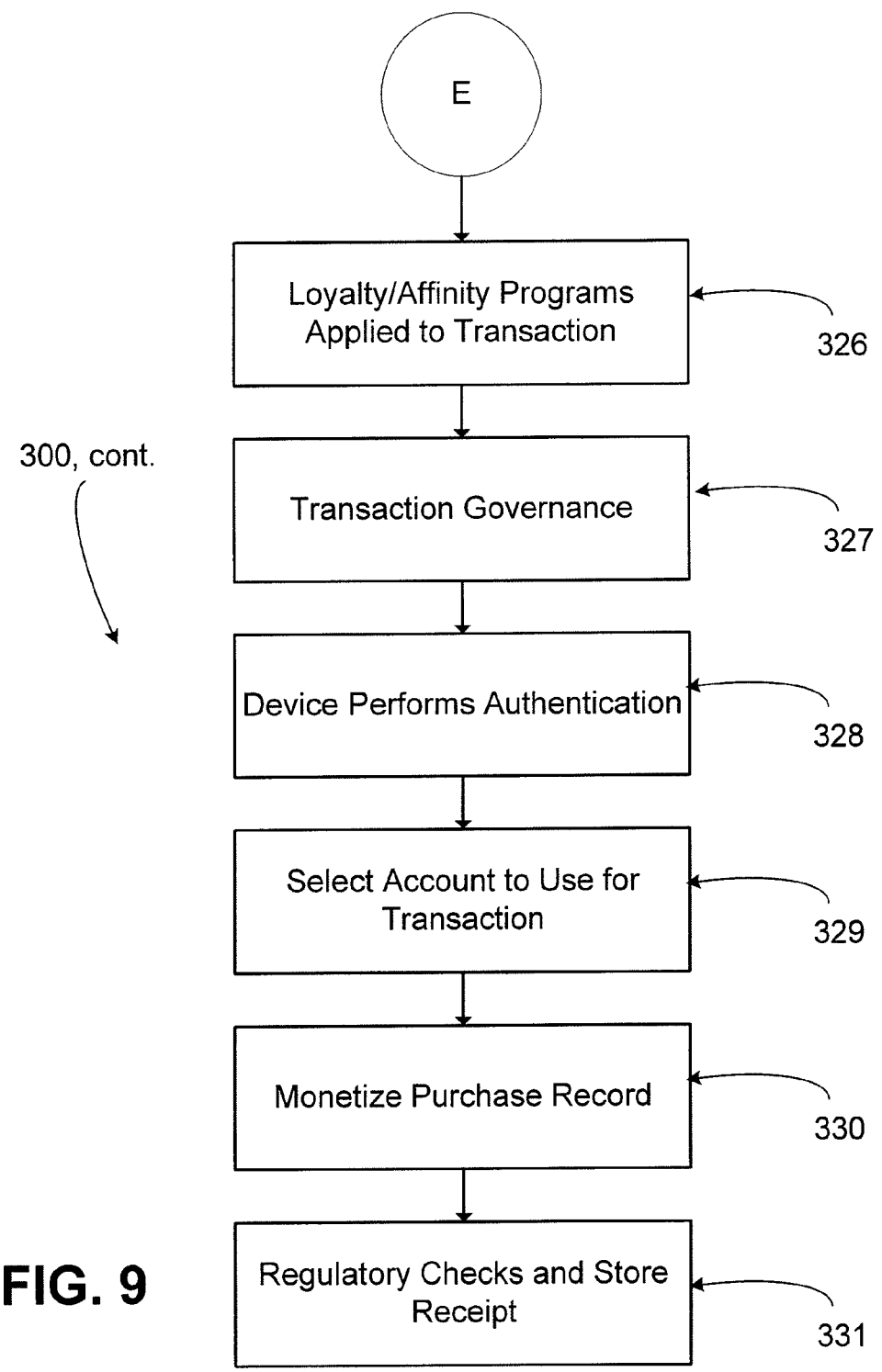

The features described above permit use of the device 101 in a method 200 of completing a transaction, one embodiment of which is illustrated in FIG. 3. At step 201, the person (customer) initiates the transaction, which can be done using a variety of different channels, including a wireless device, a land phone, the Internet, in person at the point of sale, an ATM, or a vending machine, among others. At step 202, the a determination is made whether the aspects of the transaction match pre-set purchasing preferences, which involves personal information supplied at 203A and information about the transaction supplied at 203B. Such preferences include privacy settings, transaction controls, and loyalty/affinity or other monetization factors, as well as other preferences.

If the transaction matches the preferences, the transaction must then be authenticated before proceeding. At step 204, the necessary authentication level is determined based on the transaction criteria. As stated above, different authentication levels may be necessary for different transactions, based on factors such as value and type of transaction, as well as other factors. Once the necessary authentication level is determined, authentication is performed using one or more of the various authentication methods 205, including fingerprint validation 205A, PIN validation 205B, voice biometric validation 205C, facial recognition validation 205D, or GPS location validation 205E, each described above. The authentication is performed using authentication data 206 stored on the device 101. It is understood that different authentications may be used in other embodiments.

If the transaction does not match the preferences, the person decides whether to change the preferences, at step 207, which may be initiated by a prompt, such as through the device 101. If the person does not wish to change preferences, the transaction cannot proceed, and notifications may be sent based on preferences, at step 208. If the customer does wish to change preferences, the person initiates preference changes, at step 209. Changing preferences requires authentication, and the level of authentication is determined based on the transaction criteria, as similarly described above, at step 204. The authentication is then performed, at step 205, using authentication data 206 on the device 101. Once authentication is completed, the preferences can be changed, at step 210. The changed preferences are recorded in the personal information 203A. The transaction then proceeds as normal.

If the transaction is authenticated, which is determined at step 211, then the transaction is approved, at step 212, and processed, at step 213. Transaction history is then stored, at step 214. If the transaction authentication fails, the transaction is stopped, and notifications may be sent, based on the preferences, at step 215.

The device 101 may perform some or all of the steps of the method 200 in one embodiment, however in another embodiment, at least some steps may be performed at another device connected to the device 101, such as the central computer 162 of FIG. 2. In addition, the device 101 may require information stored at an external source, again as an example, the central computer 162 of FIG. 2, in order to perform certain steps. For example, in one embodiment, the preferences and authentication information are stored at the central computer 162. In the event that another device is involved in the transaction process, such as in the determination process 202, the device 101 communicates with the other device as necessary. Such communication may include indications that certain steps of the method 200 have been performed, that the device 101 requires information to perform a step, or that the device requires the other device to wholly or partially perform a step, for example.

The information contained in, and accessible to, the device 101, as well as other information, may be monetized at the control of the person. Monetization, as described herein, incorporates the purchase of information from a person by a purchaser, and can include any publishing, sale, or other revelation or transfer of information in exchange for any value. Monetization can be done in many ways, and many different types of benefits can be accrued to the person through monetizing information. For example, certain information can be directly sold at will for money or rewards. Other types of information can be incrementally sold or automatically sold based on a prior agreement. Several examples of monetization of information are provided below, with the understanding that many additional types of information may be monetized in these or additional manners, in accordance with the present invention. It is understood that the types of monetization available to the person may be dependent on the privacy level set by the person.

In one embodiment, information related to the person is automatically or passively collected by one or more electronic devices, such as the device 101, and other electronic devices 136, such as retail sale equipment, Bluetooth sensors, and RFID sensors. This information can be collected at times and in manners as described elsewhere herein, for example, various methods for collecting proximity and dwell data, purchase history, and other types of information described herein. In one example, personal information, such as purchase or transaction history information, may be automatically collected by a financial institution in connection with uses of an account by the person, such as when a credit or debit account is used to make purchases or other monetary transfers. In another example, information may be automatically collected upon purchases or other transactions performed using the device 101 described above, including in device-to-card associations. In a further example, purchase history information may be collected automatically by a retailer, such as through a loyalty or affinity program. Proximity and dwell information can be collected for the person automatically. This collection can be done in several ways, many of which utilize the device 101. In one example, the GPS of the device 101 may be used to pinpoint the person's location and generate proximity and dwell data. In another example, external Bluetooth devices or RFID sensors may be used to detect the presence of the device 101 to generate proximity and dwell data. Various other methods can be used to detect the presence of the person with or without use of the device 101, including, for example, through use of implanted RFID chips or biological detection methods. Proximity and dwell data can also be used for follow-up actions, in addition to serving as raw data for monetization. For example, this information can be used for active chip marketing, where the person could be prompted with sales, offers, questions, surveys, etc., based on the person's proximity and dwell information, assuming that such prompts are permitted by privacy settings. In a specific example, the device 101 may be detected to be in the soft drink area of a grocery store, and the person will be prompted with an offer for a rebate on a particular brand of soft drink. It is understood that proximity and dwell features available may also be dependent on the privacy level set by the person, such as if the person has allowed publishing or collection of proximity and dwell data, and if the person has allowed prompts to be received by the device 101.

Information can also be actively solicited from the person, such as through questionnaires, profiles, and other similar instruments that request the person to provide personal information in response to at least one question or request. Information collected in this manner can be extremely valuable to vendors and advertisers for formulating demographic information and studying purchase habits and preferences. Examples of information that may be collected this way include biographical information, such as age, family size, occupation, residence address, educational level, and travel experience, and various tastes and preferences in products and services, such as food, beverages, movies, music, art, name brands, etc. Requests for information can be initiated in response to certain events, such as a purchase, or may be initiated randomly or periodically. For example, a questionnaire may be posed to a person regarding a recently-completed purchase, including information such as reasons for the particular product selection, original intentions before purchasing, additional products evaluated, etc. Previously-solicited information may serve as a basis for follow-up questions or other future solicited information.

Social network information can be collected automatically or by solicitation, including the number and identities of networked or non-networked "friends" (i.e., social or professional contacts), as well as more detailed personal information regarding such friends, including friends' biographical, information, preference information, and/or transaction histories. Additionally, social network information can include solicited information, such as information regarding communications between friends. As an example, if a person wishes to adopt a more environmentally-friendly lifestyle, he or she may consult friends/contacts to discuss ways in which this can be accomplished. The contact may suggest buying a bike or taking public transportation, and information regarding this communication can be collected by solicitation or other mechanism. In some circumstances, this information can be automatically collected, such as when a contact makes a product recommendation by selecting a product from a list or activating a link to a web page showing the product.

The information may be collected by one entity or a variety or combination of different entities, and different types of information may be collected in different manners. For example, the device 101 may collect some information, while vendors or financial institutions associated with the person can collect other information, and the information bank 404 itself may collect information. Additionally, collected information may be received and stored by one or more storage entities. The information bank 404 may be configured to store some or all information collected with relation to a person 402, and may receive this information periodically, such as upon the occurrence of each information-generating action or event concerning the person 402. In one embodiment, a financial institution associated with the person, such as the institution 164 of FIG. 2, provides for centralized storage and management of all collected monetizable information, which may be done through the centralized data storage described above. The bank 404 may compile the information in an organized format, such as in an information database in the computer 406. The bank 404 may also assemble or otherwise process at least some of the information to create a profile or other arranged information format, or to generate new information resulting from analysis of previously-collected information.

Collection of information can also be limited or enabled in many ways. For example, automatic collection of information can be limited or enabled by privacy preferences, transaction control preferences, or other pre-set preferences. Additionally, a person may be provided with the ability to retroactively prevent storage of, or to selectively delete, certain automatically collected information. Collection of solicited information may be controlled by the person's response to solicitations.

Figure 11:
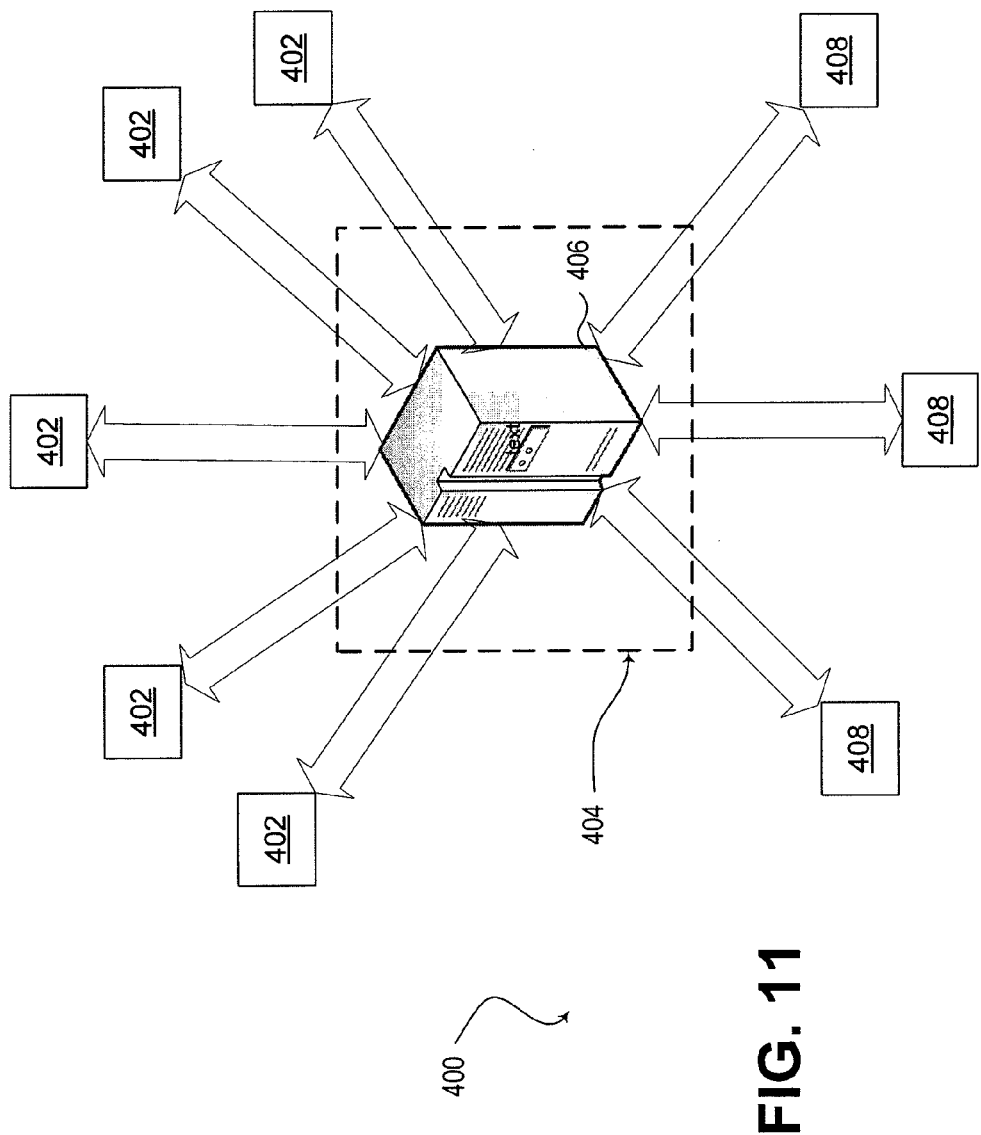
FIG. 11 is a schematic diagram of one embodiment of a system suitable for use in connection with monetization of information.

FIG. 11 illustrates one embodiment of a system 400 suitable for collecting and monetizing information for a plurality of persons 402 through an information bank 404. The information bank 404 contains a central computer or computer system 406, which contains one or more computers, each having a memory and a processor. The information bank 404 communicates with the persons 402, and receives information collected from the persons 402. The collected information may include the many different types of information identified below and may be collected in any of the manners identified herein, and further may include information of additional types and collected in additional manners. Additionally, the information may be collected from the persons 402 and transmitted to the information bank through a variety of collection points (not shown), which are capable of collecting information about the persons 402 and transmitting the information to the information bank 404, such as the device 101 of FIG. 1, or various other computers described herein. Information may also be collected directly by the information bank 404, for example, through automatic collection or solicitation procedures described above.

The information bank 404 also may take an active role in brokering, selling, advertising, etc., related to the information. For example, the bank 404 can communicate with a variety of information purchasers 408, which may connect to the information bank 404 through computers (not shown). In one embodiment, the system 400 may be configured similarly to the system 160 illustrated in FIG. 2, where the institution 164 operates as the information bank 404, the devices 101 can act as collection points or in cooperation with other devices at collection points, and the other electronic devices 174 can act as collection points and/or connections for information purchasers 408. In the embodiment shown in FIG. 11, most or all information, monetization transactions, and other communications described herein flow through the information bank 404. However, it is understood that in other embodiments, communications and transactions may be conducted between persons 402 monetizing the information and purchasers 408 buying the information, without the involvement of the information bank 404.

The information bank 404 collects and processes the personal information in various ways. In one embodiment, information collected in any of the manners described herein, including automatic collection and solicitations, is received by the information bank 404, and stored in the central computer 406 for later processing. The stored information can later be monetized, by making the information available to information purchasers 408, in exchange for value transmitted to the person(s) 402 from whom the information was collected. Additionally, some information may flow through the information bank 404 between persons 402 and information purchasers 408 who have agreed to purchase the information, without being stored by the information bank 404. Further, information may flow directly to the purchasers 408 in some embodiments, for example, in a loyalty/affinity program.

Generally, each person 402 retains at least a degree ownership and/or control over his or her own personal information, including monetization thereof. Such ownership and/or control may be limited in some ways. In one embodiment, the person 402 retains complete ownership and control of his or her own information, and may transfer, monetize, delete, etc., the information as desired. In this embodiment, the person's control may still be limited in some ways, for example, the person may not be able to alter certain information. In another embodiment, the person 402 may retain at least some retroactive control over information after it is monetized or otherwise made available to another entity. For example, if the person no longer wishes an entity to have access to certain information, the person may revoke his or her consent. It is understood that such revocation may require compensation or other consideration.

According to one exemplary embodiment, in monetizing information, the person 402 may be presented with one or more options to selectively permit publishing of at least some of the information in exchange for value. In other words, particular information related to the person 402 is identified, and the person 402 is presented with an option to allow the information to be made available to one or more purchasers 408 in exchange for value. The options may be presented in advance of, instantaneously with, immediately after, or substantially later than the collection of the information. Additionally, the decision to monetize the information can be made on an incremental or a bulk basis. As described herein, the value exchanged for the information may include cash, credit, discounts, prizes, redeemable points, and other such values described herein and commonly known. If the person 402 decides to allow monetization of any of the information, then the information is transferred and the person receives the agreed-upon value. It is understood that the value may be provided by the information bank 404, by the purchaser 408, or by another entity. Thus, the person 402 is able to control which information is monetized and which is not. Various examples of monetization opportunities for a person 402 are described below, which list is not to be considered exclusive.

In one example, the person 402 can be presented with an option to monetize information through are-arranged loyalty or affinity programs or other contractual arrangements that provide for monetization of specific information. Such arrangements can be set up through the information bank 404, which can provide collection and transmission of information for this purpose. For example, a person 402 may be offered rebates, discounts, rewards, etc., for sharing the person's purchase data with producer, retailer, or other entity during or immediately after a purchase, where purchase information is collected. The producer, retailer, or other entity may consider this consumer purchasing data to be a valuable commodity, such as for market research. This can be done at the point-of-sale or immediately after the sale, such as through a retailer computer at the point-of-sale, or by a device 101 used by the consumer. Examples of such loyalty and affinity programs include traditional loyalty rebate programs, affinity rewards programs such as "miles" and cash-back programs, "wish list" programs, and sharing programs, such as with charitable organizations. A "wish list" program involves the person selecting a particular item or items, where future transactions earn credits toward the purchase. Once sufficient credits have been accumulated, the person is presented with the item or items. The loyalty and affinity programs can be actuated in many different ways. In one example, the person 402 can be prompted by the device 101 at the point of sale to indicate whether the person will activate the loyalty/affinity program for the present purchase. In another example, the loyalty/affinity program could be automatically activated for every applicable purchase, such as in a permanent arrangement or a toggled permanent arrangement.

In a second example, information may be specifically solicited from a person 402 along with an offer to monetize the information. For example, the information bank 404 may provide the person 402 with a questionnaire, with an indication that the information will be provided to one or more purchasers for value. The person 402 can then agree or disagree to provide the information to be monetized.

In a third example, an agreement may be set up in advance between a person 402 and an insurance company, such as a life insurance, health insurance, or auto insurance company. Such arrangements can be set up through the information bank 404, which can provide collection and transmission of information for this purpose. For example, an insurance company may consider a person 402 who eats healthy food or exercises frequently to be a lower-risk client. Accordingly, the person 402 may agree to publish his/her purchase history to the insurance company, with an agreement that if certain behaviors are tracked (such as buying healthy food or keeping up a gym membership), the person 402 can be given value, such as a discount on a premium.

In a fourth example, a producer, retailer, or other entity may consider a person's proximity and dwell data to be a valuable commodity, such as for market research. Proximity and dwell data indicates which stores or other businesses the person 402 visited, which sections of the stores the person 402 spent time in, and how much time was spent there. Proximity and dwell data may be published for monetization in real-time, such as by continuously publishing the person's location, or as a history report that is collected and then published. Again, the person 402 may be offered rebates, discounts, rewards, etc., for sharing the person's proximity and dwell data with the entity. The person 402 can agree preemptively to monetize proximity and dwell information to one or more purchasers, or may make monetization decision subsequently based on previously-collected information. Such arrangements can be set up through the information bank 404, which can provide collection and transmission of information for this purpose.

In a fifth example, a network of social contacts may choose to aggregate their information and monetize it as a "block" of data. This collected information may have greater value to certain entities, as it can provide, for example, comprehensive information regarding people of one demographic or across demographics, information about which social contacts have more influence over others' preferences, indications of which preferences are likely to spread within a group of social contacts, information on communications between friends related to decision-making processes, and other information that cannot be gleaned from an individual's information. It is understood that a person may be required to give up some control over his or her information in such an aggregate arrangement, and it is contemplated that a person may be able to withdraw from the arrangement at will.

In a sixth example, personal information of various types can be collected and stored by the information bank 404 and subsequently monetized by the person 402. Such subsequent monetization can be performed on an incremental or bulk basis. For example, the person 402 can choose specific information to be incrementally provided to one or more specific purchasers, or to be generally made available to others. As another example, a person 402 may agree to monetize all of his or her related information, or all information of a specified type. As a further example, personal information of many types may be collected and arranged to form a "profile" of the person 402, which can be monetized to interested purchasers 408. Still further, such information may be sold on a "subscription" basis, where a purchaser 408 agrees to provide value for a person's continually-updated information profile.

In one exemplary embodiment, the information bank 404 may provide various mechanisms to assist in such incremental or bulk monetization of information. For example, offers to purchase information, acceptances of offers, and purchase agreements can flow through the information bank 404. The information bank 404 may receive an offer for monetization of certain information from a purchaser 408 or from the person(s) 402 corresponding to the information, and may transmit this offer accordingly. An offer from a purchaser 408 may pertain, e.g., to specific or general information from a specific person 402, information matching a specified description, or offers for specific or general information related to persons matching a specified description or demographic. An offer from a person 402 may, e.g., pertain to a specific purchaser or purchasers 408, or may be a general offer to sell information to a first bidder, a highest bidder, or all bidders. The information bank 404 may provide mechanisms for receiving and transmitting such offers or bids for information, and for receiving and transmitting acceptances of such offers or bids. In one embodiment, the information bank 404 also processes purchase agreements between persons 402 and purchasers 408. Generally, the bank 404 receives a confirmation that a purchase agreement has been formed, which may constitute, for example, an acceptance of a previously-transmitted offer or a more formal notification. Each purchase agreement typically identifies designated information that is subject to the agreement. Upon receiving confirmation of a purchase agreement, the bank 404 will make the designated information available to the corresponding purchaser 408. Further, the bank 404 may also arrange for conferring value to the person 402. In one example, where a financial institution is acting as the information bank 404, the bank 404 can receive and transmit the value to the person 402. It is understood that the person 402 may have an account with the bank 404 which can be credited to accomplish transmitting the value.

The information bank 404 may also provide for advertising personal information using descriptions that may entice offers from purchasers 408. Accordingly, greater detail and more comprehensive information related to a person 402 may make personal information more valuable or easily monetizable. Additionally, information may accrue additional value as more information related to a person 402 accumulates, as aggregate information may provide for better and more detailed analysis by a purchaser 408, such as in studying purchasing patterns for certain demographics. On the other hand, certain information may be time-sensitive, decreasing in value as it becomes stale. The information bank 404 may choose to distinguish between time-sensitive information and information that is valuable in the aggregate, to allow the person 402 to make educated decisions regarding monetization of the information. Ultimately, in this embodiment, the information bank 404 can form a marketplace for monetization of information, where sellers (i.e. persons 402) and purchasers 408 can transact business in the sellers' personal information.

Many of the features described above, being used by or in connection with the device 101, can be incorporated in one embodiment of a process 300 for conducting a plurality of transactions, illustrated in FIGS. 4-9, provided in an exemplary manner as a trip to a grocery store. The method 300 spans over several figures, and the steps are connected through indicators A-E. The method 300 incorporates many features of the concierge described above. As described herein, the concierge may be embodied by a program or combination of programs on the device and/or other computers in communication with the device 101. Further, as described above with respect to the method 200 of FIG. 3, the device 101 may perform certain steps of the method 300 in one embodiment, however in another embodiment, at least some steps may be performed at another device connected to the device 101, such as the central computer 162 of FIG. 2 or the information bank computer 406 of FIG. 11. These other computers may otherwise be involved in performing steps of the method 300, such as in the manners discussed above with respect to the method 200 of FIG. 3.

At step 301, the person decides that he/she wants to purchase a particular product, such as a bottle of wine. At step 301A, the person uses the social networking features of the device to search for group recommendations for the wine. These recommendations can be collected and used for future monetization purposes. At step 302, the person consults the concierge service using the device 101 to determine one or more locations to purchase the wine. At step 303, the concierge identifies a nearby store, confirms the availability of the wine in stock, and provides directions and travel time estimates to the store. The travel time estimates can be provided for several locations, including current GPS location and set GPS locations, such as the person's work or home. At step 304, the person chooses to buy the wine at 5:00 after leaving work and enters that information into the device 101. At step 305, the concierge service generates a reminder to buy the wine at that time, stores the work address and store location, and generates a notification to the person's spouse of the decision.

At step 306, the concierge activates the reminder to buy the wine at the appropriate time and again checks the availability of the wine. At step 307, the device receives a communication from the automobile computer that the fuel tank is low, and the concierge generates a notification on the device 101 and identifies gas stations en route to the store. At step 308, the device 101 is provided with a map to the store and the gas station, as well as GPS voice-driven directions. The device 101 may access traffic information, and due to traffic, the voice driven directions may suggest a different route. At step 309, the person stops at the gas station, purchases gas using the device 101, and notifies the person that the purchase has earned a free cup of coffee.

At step 310, the person arrives at the store and the concierge detects this using the GPS. At step 311, the concierge again checks the availability of the wine and generates reminders. One reminder, generated at the person's request, notifies the person that the store has a coin exchange machine. Another reminder, automatically generated, notifies the person of an upcoming benchmark for a related loyalty/affinity program that can be reached with a specified purchase at the store, as well as details about the loyalty/affinity program. At step 312, the device 101 collects proximity and dwell data that is monetized, by a prior agreement, to provide the person with rewards proportional to the purchases made in the store. At step 313, the device 101 receives proximity-based advertising and offers based on the device's proximity information. At step 314, the device 101 enables loyalty features for the store based on the device's proximity, including current sales and specials, along with a map of the store, including a location of the coin exchange machine. It is understood that steps 312-314 are enabled due to the privacy settings of the device 101.

At step 315, the person uses the coin exchange machine to cash in a stash of loose change. At step 316, the person uses the device 101 to accept payment for the value of the coins through communication with the coin exchange machine and/or the operator of the machine, which is transferred to a debit account through the device 101.

At step 317, the person receives, through the device, an email from the spouse to buy a second item. At step 318, the person uses the device 101 to locate the second item on the map of the store.

At step 319, the person picks up the second item, and at step 320, the person is prompted, based on proximity, to provide a comment on the item's quality in exchange for a discount. This comment can be provided at a later time, and also be shared with the person's social network. At step 321, the person uses the device 101 to consult his/her social network to check for experience or recommendations about the wine to be purchased. At step 322, the person picks up the wine, and at step 323, is again prompted, based on proximity, to grade the quality of the wine in exchange for a discount. Additionally, at step 324, the person is prompted, based on proximity, to enter a wine loyalty rewards program.

At step 325, the person initiates the checkout transaction using a device-to-card procedure as described above. At step 326, loyalty/affinity discounts and considerations are applied to the purchase. At step 327, the device 101 automatically checks age, legal history, probation status, and applicable alcohol purchase laws before allowing purchase. At step 328, the device 101 performs fingerprint and PIN authentication, as well as GPS verification. At step 329, the person selects an account to use for the transaction, and is notified of one account that could potentially exceed an account limit if used. At step 330, the device 101 prompts the user to permit the wine purchase record to be monetized by publishing to the another entity. At step 331, the device 101 performs several regulatory checks and stores and catalogues the receipt of the transaction for tax purposes. The transaction is thereafter complete.

It is understood that the method 300 described above is an illustrative example showing the use of many of the features of the device 101, and that the device 101 and associated features can be used in nearly a limitless number of transactions.

As stated above, FIGS. 3-9 illustrate examples of one or more aspects of various methods, and various additional methods are described in connection with FIGS. 1, 2, 10, and 11. The steps of the methods described above can be accomplished by means and/or components contained within the device 101, such as the memory 115, processor 103, and/or program modules and computer-executable instructions stored therein or executed thereby, and may also be accomplished by non-computer means, such as by IT personnel or forensic investigators, or by a combination of human and computerized components. As described above, certain steps can also be performed by or in conjunction with communication with external computers. Other components of the computer system 101 may also constitute means for accomplishing aspects of the present invention, as understood by those skilled in the art. It is understood that one entity or computer system may not perform each and every aspect of the present invention and that aspects may be performed by one or more other entities.

Aspects of the present invention are operational with numerous other general purpose or special purpose computing system environments or configurations. Examples of well known computing systems, environments, and/or configurations that may be suitable for use with the present invention include, but are not limited to, personal computers, server computers, laptop devices, multiprocessor systems, microprocessor-based systems, set top boxes, programmable consumer electronics, network PCs, minicomputers, mainframe computers, distributed computing environments that include any of the above systems or devices, and the like.

Aspects of the present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in memory 115 which may include both local and remote computer storage media including memory storage devices. It is understood that connections and communications disclosed herein may be made by any type of wired or wireless connection or communication.

Aspects of the present invention provide many benefits not provided by prior systems and methods for information management. For example, the privacy and information control aspects provide complete control over which personal information can be published, and the monetization aspects permit a person to benefit from publishing of such information. Features such as GPS location permit a greater amount of information to be generated, which can also be controlled and/or monetized by the person. Further, the authentication features permit secure transactions with extensive protection against fraud and prevention of unauthorized identity use. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. The term "person," as used herein, refers not only to living human beings, but also to any other legal entity, including corporations and other business or charitable organizations. Accordingly, while the specific examples have been illustrated and described, numerous modifications come to mind without significantly departing from the spirit of the invention and the scope of protection is only limited by the scope of the accompanying claims.

What is claimed is:

1. A method comprising:
   initiating a financial transaction involving a person using a mobile device;
   determining a selected method for authenticating the transaction based on a characteristic of the transaction, wherein the selected method is selected from a plurality of authentication methods, each utilizing a different type of information for authentication; and
   receiving, by the mobile device, authentication information related to the person;
   authenticating the person using the mobile device by verification of the authentication information, using the selected method,
   wherein if the person is authenticated, the transaction is completed using the mobile device, and if the person is not authenticated, the transaction is prevented.

2. The method of claim 1, wherein the initiating, receiving, and authenticating are all performed at a point-of-sale.

3. The method of claim 1, wherein the selected method is selected from the group of authentication methods consisting of: fingerprint validation, voice validation, facial recognition validation, iris scan validation, PIN validation, and GPS location validation.

4. The method of claim 1, wherein the selected method of authentication is determined to be a first selected method when the characteristic is a first characteristic, and the selected method of authentication is determined to be a second selected method when the characteristic is a second characteristic that is different from the first characteristic.

5. The method of claim 1, wherein the characteristic of the transaction used in determining the selected method comprises a monetary value of the transaction, wherein the selected method of authentication is determined to be a first selected method when the monetary value of the transaction is within a first predetermined range, and the selected method of authentication is determined to be a second selected method when the monetary value of the transaction is within a second predetermined range, said second predetermined range being higher than said first predetermined range.

6. The method of claim 1, wherein the characteristic of the transaction used in determining the selected method comprises a type of the transaction, wherein the selected method of authentication is determined to be a first selected method when the transaction is of a first type, and the selected method of authentication is determined to be a second selected method when the transaction is of a second type that is different from the first type.

7. The method of claim 1, wherein the mobile device verifies the authentication information by comparing the information to validated information accessible to the mobile device.

8. The method of claim 1, wherein the selected method comprises two or more authentication methods selected from the plurality of authentication methods.

9. A mobile device comprising a processor configured for use in conducting a plurality of financial transactions related to the person using the mobile device, wherein, in performing each transaction, the processor is configured to cause the mobile device to perform:
   initiating a financial transaction involving a person using the mobile device;
   determining a selected method for authenticating the transaction based on a characteristic of the transaction, wherein the selected method is selected from a plurality of authentication methods, each utilizing a different type of information for authentication; and
   receiving, by the mobile device, authentication information related to the person;
   authenticating the person using the mobile device by verification of the authentication information, using the selected method,
   wherein if the person is authenticated, the transaction is completed using the mobile device, and if the person is not authenticated, the transaction is prevented.

10. A computer-readable medium containing computer-executable instructions configured to cause a mobile device perform:
   initiating a financial transaction involving a person using the mobile device;
   determining a selected method for authenticating the transaction based on a characteristic of the transaction, wherein the selected method is selected from a plurality of authentication methods, each utilizing a different type of information for authentication; and
   receiving, by the mobile device, authentication information related to the person;
   authenticating the person using the mobile device by verification of the authentication information, using the selected method,
   wherein if the person is authenticated, the transaction is completed using the mobile device, and if the person is not authenticated, the transaction is prevented.

11. A method comprising:
   initiating a financial transaction involving a person, using a mobile device;
   determining, based on a characteristic of the transaction, a necessary authentication level for the transaction within a hierarchy of authentication levels, wherein each authentication level within the hierarchy requires a different authentication method;
   receiving, at the mobile device, authentication information related to the person based on the necessary authentication level; and
   authenticating the person by verification of the authentication information, using the mobile device, using the authentication method required by the necessary authentication level,
   wherein if the person is authenticated, the transaction is completed, and if the person is not authenticated, the transaction is prevented.

12. The method of claim 11, wherein the authentication method is selected from the group consisting of: fingerprint validation, voice validation, facial recognition validation, iris scan validation, PIN validation, and GPS location validation.

13. The method of claim 11, wherein the characteristic of the transaction used in determining the necessary authentication level comprises a monetary value of the transaction, wherein the method of authentication required is a first method when the monetary value of the transaction is within a first predetermined range, and the method of authentication required is a second method when the monetary value of the transaction is within a second predetermined range, said second predetermined range being higher than said first predetermined range.

14. The method of claim 11, wherein the characteristic of the transaction used in determining the necessary authentication level comprises a type of the transaction, wherein the method of authentication required is a first method when the transaction is of a first type, and the method of authentication required is a second method when the transaction is of a second type that is different from the first type.

15. The method of claim 11, wherein each authentication level in the hierarchy of authentication levels requires an authentication method comprising the cumulative authentication methods of all lower authentication levels in the hierarchy and an additional authentication method.

16. The method of claim 11, wherein the necessary authentication level for the transaction is determined based on preferences previously indicated by the person.

17. A mobile device comprising a processor configured for use in conducting a plurality of financial transactions related to the person using the mobile device, wherein, in performing each transaction, the processor is configured to cause the mobile device to perform:
   initiating a financial transaction involving a person;
   determining, based on a characteristic of the transaction, a necessary authentication level for the transaction within a hierarchy of authentication levels, wherein each authentication level requires a different authentication method;
   receiving authentication information related to the person based on the necessary authentication level; and
   authenticating the person by verification of the authentication information, using the authentication method required by the necessary authentication level,
   wherein if the person is authenticated, the transaction is completed, and if the person is not authenticated, the transaction is prevented.

18. A computer-readable medium containing computer-executable instructions configured to cause a mobile device to perform:
   initiating a financial transaction involving a person;
   determining, based on a characteristic of the transaction, a necessary authentication level for the transaction within a hierarchy of authentication levels, wherein each authentication level requires a different authentication method;

receiving authentication information related to the person based on the necessary authentication level; and authenticating the person by verification of the authentication information, using the authentication method required by the necessary authentication level, wherein if the person is authenticated, the transaction is completed, and if the person is not authenticated, the transaction is prevented.

19. A mobile device comprising:
a biometric sensor configured to read biometric information of a person;
a processor configured to cause the mobile device to perform:
   receiving, at a point-of-sale, information regarding a financial transaction occurring at the point-of-sale;
   determining, based on a characteristic of the transaction, one or more types of biometric information which are necessary for authenticating the transaction;
   receiving, at the point-of-sale, biometric information of a person involved in the financial transaction, wherein the received biometric information corresponds to the one or more types of biometric information that are determined to be necessary;
   verifying, at the point-of-sale, the biometric information by comparing the biometric information with stored biometric information accessible to the processor; and
   transmitting a signal confirming the verification of the biometric information,
wherein the transaction is prevented unless the biometric information is verified.

20. The mobile device of claim 19, wherein the biometric information is selected from the group consisting of: fingerprint information, voice validation information, facial recognition information, and iris scan information.

21. The mobile device of claim 19, wherein the processor is further configured to cause the mobile device to perform:
   automatically periodically gathering additional biometric information related to the person; and
   re-authenticating the person by verification of the additional biometric information.

22. The mobile device of claim 19, wherein the mobile device is a mobile phone.

23. The mobile device of claim 19, further comprising:
a recognition element configured to recognize a payment card, wherein the mobile device is configured to be used in connection with the payment card to complete the financial transaction, wherein the recognition element recognizes the payment card.

24. The mobile device of claim 23, wherein the recognition element is configured to recognize at least one element from the group consisting of: physical orientation elements, optical storage, smart card elements, contacted communication elements, machine decodable images, barcodes, and magstripes.

25. A system comprising:
a mobile device comprising a biometric sensor configured to read biometric information of a person and a processor configured to cause the mobile device to perform:
   receiving, at a point-of-sale, information regarding a financial transaction occurring at the point-of-sale;
   determining, based on a characteristic of the transaction, one or more types of biometric information which are necessary for authenticating the transaction;
   receiving, at the point-of-sale, biometric information of a person to the financial transaction, the received biometric information corresponding to the one or more types of biometric information that are determined to be necessary;
   verifying, at the point-of-sale, the biometric information by comparing the biometric information with stored biometric information accessible to the processor; and
   transmitting a signal confirming the verification of the biometric information,
wherein the transaction is prevented unless the biometric information is verified; and
a payment card, wherein the payment card cannot be used to complete a financial transaction without verification and recognition of the payment card by the mobile device.

* * * * *